US008064710B2

(12) United States Patent
Mizoguchi

(10) Patent No.: US 8,064,710 B2
(45) Date of Patent: Nov. 22, 2011

(54) IMAGE PROCESSING APPARATUS, METHOD OF CONTROLLING THEREOF, AND PROGRAM

(75) Inventor: Shigeru Mizoguchi, Kawasaki (JP)

(73) Assignee: Canon Kabushiki Kaisha (JP)

( * ) Notice: Subject to any disclaimer, the term of this patent is extended or adjusted under 35 U.S.C. 154(b) by 1434 days.

(21) Appl. No.: 11/294,134

(22) Filed: Dec. 5, 2005

(65) Prior Publication Data

US 2006/0120618 A1 Jun. 8, 2006

(30) Foreign Application Priority Data

Dec. 6, 2004 (JP) ................................ 2004-353245
Dec. 1, 2005 (JP) ................................ 2005-347568

(51) Int. Cl.
*G06K 9/00* (2006.01)

(52) U.S. Cl. ..... 382/233; 382/250; 382/253; 375/240.2; 375/240.22

(58) Field of Classification Search .................. 382/255, 382/264
See application file for complete search history.

(56) References Cited

U.S. PATENT DOCUMENTS

| 5,589,829 | A | * | 12/1996 | Astle .......................... 341/67 |
| 5,841,473 | A | * | 11/1998 | Chui et al. .................. 348/390.1 |
| RE37,668 | E | * | 4/2002 | Etoh ............................ 382/251 |
| 6,650,361 | B1 | * | 11/2003 | Shiomi ...................... 348/218.1 |
| 7,936,934 | B2 | * | 5/2011 | Nakaya ........................ 382/233 |
| 7,936,935 | B2 | * | 5/2011 | Nakaya ........................ 382/233 |
| 7,961,959 | B2 | * | 6/2011 | Bashyam et al. ............. 382/232 |
| 7,961,960 | B2 | * | 6/2011 | Bashyam et al. ............. 382/232 |
| 7,967,406 | B2 | * | 6/2011 | Silverbrook et al. ............ 347/5 |
| 7,970,216 | B2 | * | 6/2011 | Bashyam et al. ............. 382/232 |
| 2004/0057619 | A1 | * | 3/2004 | Lim et al. ..................... 382/182 |
| 2004/0066981 | A1 | * | 4/2004 | Li et al. ........................ 382/286 |
| 2004/0120598 | A1 | * | 6/2004 | Feng ............................ 382/263 |

FOREIGN PATENT DOCUMENTS

| JP | 2001-194575 A | 7/2001 |
| JP | 2002-304628 A | 10/2002 |
| JP | 2003-087442 A | 3/2003 |

* cited by examiner

*Primary Examiner* — John Lee
(74) *Attorney, Agent, or Firm* — Rossi, Kimms & McDowell, LLP

(57) ABSTRACT

An object of the present invention is to detect characteristics of images such as blurring and the like without expanding compressed and stored image data. And, the above-described detection is realized by detecting image characteristics on the basis of attached information of an image, such as relation between low frequency components and high frequency components of alternate current components and contents of a quantization table of image data compressed by a compression system for converting image data into spatial frequency components. In addition, for example, as a result of detection, an image discriminated to be in a blurred state is controlled so as not to be inserted into an album template or to be inserted into a small area inside the album template. Thereby, a user can omit work of picking and choosing images to insert into an album template while taking a look at a lot of images.

4 Claims, 37 Drawing Sheets

FIG. 2

| 0 | 1 | 5 | 6 | 14 | 15 | 27 | 28 |
|---|---|---|---|---|---|---|---|
| 2 | 4 | 7 | 13 | 16 | 26 | 29 | 42 |
| 3 | 8 | 12 | 17 | 25 | 30 | 41 | 43 |
| 9 | 11 | 18 | 24 | 31 | 40 | 44 | 53 |
| 10 | 19 | 23 | 32 | 39 | 45 | 52 | 54 |
| 20 | 22 | 33 | 38 | 46 | 51 | 55 | 60 |
| 21 | 34 | 37 | 47 | 50 | 56 | 59 | 61 |
| 35 | 36 | 48 | 49 | 57 | 58 | 62 | 63 |

FIG. 14

SETTING ITEM

☆ SIMILAR IMAGE DETECTION

☆ BLURRING IMAGE DETECTION

☆ IMAGE QUALITY DISCRIMINATION

☆ NUMBER OF ALBUM IMAGES

FIG. 17

▼ MAIN INFORMATION

|  | TAG NO. |
|---|---|
| TITLE | 0x010e |
| MAKER NAME | 0x010f |
| MACHINE TYPE | 0x0110 |
| IMAGE ORIENTATION | 0x0112 |
| HORIZONTAL RESOLUTION | 0x011a |
| VERTICAL RESOLUTION | 0x011b |
| RESOLUTION UNIT | 0x0128 |
| SOFTWARE | 0x0131 |
| CHANGED DATE | 0x0132 |
| WRITE POINT | 0x013e |
| PRIMARY CHROMATICITIES | 0x013f |
|  | 0x0211 |
| YCbCr POSITIONING | 0x0213 |
| REFERENCE BLACK WHITE | 0x0214 |
| COPYRIGHT | 0x8298 |
| Exif INFORMATION OFFSET | 0x8769 |

FIG. 18

▽ SUB-INFORMATION

| | TAG NO. | | TAG NO. | | TAG NO. |
|---|---|---|---|---|---|
| EXPOSURE TIME | 0x829a | FLASH | 0x9209 | SENCING METHOD | 0xa217 |
| LENS F-VALUE | 0x829d | LENS FOCAL LENGTH | 0x920a | FILE SOURCE | 0xa300 |
| EXPOSURE CONTROL MODE | 0x8822 | CAMERA INTERNAL INFORMATION | 0x927c | SCENE TYPE | 0xa301 |
| ISO SPEED RATINGS | 0x8827 | USER COMMENT | 0x9286 | CFA PATTERN | 0xa302 |
| Exif VERSION | 0x9000 | SUBSEC TIME | 0x9290 | INDIVISUAL IMAGE PROCESSING | 0xa401 |
| ORIGINAL PHOTOGRAPHING DATE AND TIME | 0x9003 | SUBSEC TIME ORIGINAL | 0x9291 | EXPOSURE MODE | 0xa402 |
| DIGITIZATION DATE AND TIME | 0x9004 | SUBSEC TIME DIGITIZED | 0x9292 | WHITE BALANCE | 0xa403 |
| EACH COMPONENT MEANING | 0x9101 | FRASH PIX VERSION | 0xa000 | DIGITAL ZOOM MAGNIFICATION | 0xa404 |
| IMAGE COMPRESSION RATIO | 0x9102 | COLOR SPACE INFORMATION | 0xa001 | LENS FOCAL LENGTH IN 35mm | 0xa405 |
| SHUTTER SPEED VALUE | 0x9201 | IMAGE WIDTH | 0xa002 | PHOTOGRAPHING SCENE TYPE | 0xa406 |
| APERTURE VALUE | 0x9202 | IMAGE HEIGHT | 0xa003 | GAIN CONTROL | 0xa407 |
| BRIGHTNESS VALUE | 0x9203 | RELATED SOUND FILE | 0xa004 | PHOTOGRAPHING CONTRAST | 0xa408 |
| EXPOSURE CORRECTION AMOUNT | 0x9204 | ExifR98 EXPANSION INFORMATION | 0xa005 | PHOTOGRAPHING CHROMA | 0xa409 |
| OPEN F-VALUE | 0x9205 | FOCAL PLANE X RESOLUTION | 0xa20e | PHOTOGRAPHING SHARPNESS | 0xa40a |
| SUBJECT DISTANCE | 0x9206 | FOCAL PLANE Y RESOLUTION | 0xa20f | PHOTOGRAPHING CONDITION DESCRIPTION INFORMATION | 0xa40b |
| AUTO EXPOSURE PHOTOMETRY MODE | 0x9207 | FOCAL PLANE RESOLUTION UNIT | 0xa210 | | |
| LIGHT SOURCE | 0x9208 | EXPOSURE INDEX | 0xa215 | OBJECT DISTANCE RANGE | 0xa40c |

FIG. 29

NUMBER OF DATA AND AVERAGE VALUE

| COLOR | NUMBER | GROUP A | GROUP B | GROUP C | GROUP D | GROUP E | GROUP F |
|---|---|---|---|---|---|---|---|
| VERTICAL (RED) | 1301 | 36 | 1 | 0 | 107 | 11 | 11 |
| HORIZONTAL (GREEN) | 1615 | 25 | 1 | 0 | 7 | 79 | 6 |
| RIGHT-OBLIQUELY (BLUE) | 133 | 34 | 1 | 0 | 50 | 49 | 19 |
| LEFT-OBLIQUELY (ORANGE) | 27 | 33 | 1 | 0 | 49 | 47 | 17 |
| NON-ADAPTED (BLACK) | 55555 | 1 | 0 | 0 | 1 | 1 | 1 |
| NON-ADAPTED (GRAY) | 2293 | 22 | 2 | 0 | 30 | 34 | 12 |
| NON-ADAPTED (WHITE) | 280 | 32 | 1 | 0 | 42 | 38 | 27 |

RATIO FOR POPULATION OF EACH OF RED, GREEN, BLUE AND ORANGE

| COLOR | RATIO |
|---|---|
| VERTICAL (RED) | 0.42 |
| HORIZONTAL (GREEN) | 0.53 |
| RIGHT-OBLIQUELY (BLUE) | 0.04 |
| LEFT-OBLIQUELY (ORANGE) | 0.01 |

RATIO FOR POPULATION OF EACH OF RED, GREEN, BLUE, ORANGE, WHITE AND GRAY

| COLOR | RATIO |
|---|---|
| VERTICAL (RED) | 0.23 |
| HORIZONTAL (GREEN) | 0.29 |
| RIGHT-OBLIQUELY (BLUE) | 0.02 |
| LEFT-OBLIQUELY (ORANGE) | 0.00 |
| NON-ADAPTED (GRAY) | 0.41 |
| NON-ADAPTED (WHITE) | 0.05 |

FIG. 30

NUMBER OF DATA AND AVERAGE VALUE

| COLOR | NUMBER | GROUP A | GROUP B | GROUP C | GROUP D | GROUP E | GROUP F |
|---|---|---|---|---|---|---|---|
| VERTICAL (RED) | 0 | 0 | 0 | 0 | 0 | 0 | 0 |
| HORIZONTAL (GREEN) | 1059 | 22 | 0 | 0 | 4 | 76 | 3 |
| RIGHT-OBLIQUELY (BLUE) | 3 | 32 | 1 | 0 | 39 | 63 | 11 |
| LEFT-OBLIQUELY (ORANGE) | 1 | 12 | 0 | 0 | 21 | 17 | 5 |
| NON-ADAPTED (BLACK) | 59366 | 1 | 0 | 0 | 0 | 1 | 1 |
| NON-ADAPTED (GRAY) | 775 | 16 | 1 | 0 | 4 | 52 | 3 |
| NON-ADAPTED (WHITE) | 0 | 0 | 0 | 0 | 0 | 0 | 0 |

RATIO FOR POPULATION OF EACH OF RED, GREEN, BLUE AND ORANGE

| COLOR | RATIO |
|---|---|
| VERTICAL (RED) | 0.00 |
| HORIZONTAL (GREEN) | 1.00 |
| RIGHT-OBLIQUELY (BLUE) | 0.00 |
| LEFT-OBLIQUELY (ORANGE) | 0.00 |

RATIO FOR POPULATION OF EACH OF RED, GREEN, BLUE, ORANGE, WHITE AND GRAY

| COLOR | RATIO |
|---|---|
| VERTICAL (RED) | 0.00 |
| HORIZONTAL (GREEN) | 0.58 |
| RIGHT-OBLIQUELY (BLUE) | 0.00 |
| LEFT-OBLIQUELY (ORANGE) | 0.00 |
| NON-ADAPTED (GRAY) | 0.42 |
| NON-ADAPTED (WHITE) | 0.00 |

FIG. 31

NUMBER OF DATA AND AVERAGE VALUE

| COLOR | NUMBER | GROUP A | GROUP B | GROUP C | GROUP D | GROUP E | GROUP F |
|---|---|---|---|---|---|---|---|
| VERTICAL (RED) | 559 | 21 | 0 | 0 | 66 | 6 | 5 |
| HORIZONTAL (GREEN) | 0 | 0 | 0 | 0 | 0 | 0 | 0 |
| RIGHT-OBLIQUELY (BLUE) | 7 | 13 | 0 | 0 | 28 | 16 | 4 |
| LEFT-OBLIQUELY (ORANGE) | 0 | 0 | 0 | 0 | 0 | 0 | 0 |
| NON-ADAPTED (BLACK) | 60241 | 1 | 1 | 0 | 1 | 0 | 1 |
| NON-ADAPTED (GRAY) | 393 | 16 | 0 | 0 | 47 | 5 | 5 |
| NON-ADAPTED (WHITE) | 4 | 15 | 0 | 0 | 25 | 19 | 8 |

RATIO FOR POPULATION OF EACH OF RED, GREEN, BLUE AND ORANGE

| COLOR | RATIO |
|---|---|
| VERTICAL (RED) | 0.99 |
| HORIZONTAL (GREEN) | 0.00 |
| RIGHT-OBLIQUELY (BLUE) | 0.01 |
| LEFT-OBLIQUELY (ORANGE) | 0.00 |

RATIO FOR POPULATION OF EACH OF RED, GREEN, BLUE, ORANGE, WHITE AND GRAY

| COLOR | RATIO |
|---|---|
| VERTICAL (RED) | 0.58 |
| HORIZONTAL (GREEN) | 0.00 |
| RIGHT-OBLIQUELY (BLUE) | 0.01 |
| LEFT-OBLIQUELY (ORANGE) | 0.00 |
| NON-ADAPTED (GRAY) | 0.41 |
| NON-ADAPTED (WHITE) | 0.00 |

FIG. 32

NUMBER OF DATA AND AVERAGE VALUE

| COLOR | NUMBER | GROUP A | GROUP B | GROUP C | GROUP D | GROUP E | GROUP F |
|---|---|---|---|---|---|---|---|
| VERTICAL (RED) | 1424 | 29 | 2 | 0 | 77 | 13 | 13 |
| HORIZONTAL (GREEN) | 3149 | 28 | 2 | 0 | 12 | 74 | 13 |
| RIGHT-OBLIQUELY (BLUE) | 674 | 24 | 2 | 0 | 34 | 36 | 13 |
| LEFT-OBLIQUELY (ORANGE) | 82 | 24 | 2 | 0 | 34 | 38 | 13 |
| NON-ADAPTED (BLACK) | 15281 | 4 | 0 | 0 | 5 | 6 | 3 |
| NON-ADAPTED (GRAY) | 6305 | 26 | 5 | 0 | 28 | 32 | 26 |
| NON-ADAPTED (WHITE) | 3085 | 32 | 3 | 0 | 34 | 37 | 32 |

RATIO FOR POPULATION OF EACH OF RED, GREEN, BLUE AND ORANGE

| COLOR | RATIO |
|---|---|
| VERTICAL (RED) | 0.27 |
| HORIZONTAL (GREEN) | 0.59 |
| RIGHT-OBLIQUELY (BLUE) | 0.13 |
| LEFT-OBLIQUELY (ORANGE) | 0.02 |

RATIO FOR POPULATION OF EACH OF RED, GREEN, BLUE, ORANGE, WHITE AND GRAY

| COLOR | RATIO |
|---|---|
| VERTICAL (RED) | 0.10 |
| HORIZONTAL (GREEN) | 0.21 |
| RIGHT-OBLIQUELY (BLUE) | 0.05 |
| LEFT-OBLIQUELY (ORANGE) | 0.01 |
| NON-ADAPTED (GRAY) | 0.43 |
| NON-ADAPTED (WHITE) | 0.21 |

FIG. 40A

| BASIC SYSTEM | | QUANTIZATION TABLE | | |
|---|---|---|---|---|
| | | T9 (541) | T6 (712) | T3 (1063) |
| RESOLUTION | 135dpi < | HIGH | MIDDLE | LOW |
| | 75dpi < | MIDDLE | LOW | LOW |
| | 70dpi > | LOW | LOW | LOW |

FIG. 40B

| INPUT/OUTPUT RESOLUTION | PRINT SIZE | |
|---|---|---|
| | A4 | L SIZE |
| 1600*1200 | UXGA | 140dpi |
| 1024*960 | SXGA | 112dpi | 256dpi |
| 640*480 | VGA | 56dpi | 128dpi |

FIG. 40C

| UNKNOWN OUTPUT SIZE | | QUANTIZATION TABLE | | |
|---|---|---|---|---|
| | | T9 (541) | T6 (712) | T3 (1063) |
| INPUT SIZE | UXGA < | HIGH | HIGH | MIDDLE |
| | VGA < | HIGH | MIDDLE | LOW |
| | VGA > | MIDDLE | LOW | LOW |

※ "MIDDLE" IS ASSIGNED TO "HIGH" OR "LOW" IN ACCORDANCE WITH PRESENCE OR ABSENCE OF PERSON (FACE) IN SUBJECT IMAGE.
PRESENCE OF PERSON (FACE) = "LOW"
ABSENCE OF PERSON (FACE) = "HIGH"

*FIG. 42*

| 0 | 1 | 5 | 6 | 14 | 15 | 27 | 28 |
|---|---|---|---|----|----|----|----|
| 2 | 4 | 7 | 13 | 16 | 26 | 29 | 42 |
| 3 | 8 | 12 | 17 | 25 | 30 | 41 | 43 |
| 9 | 11 | 18 | 24 | 31 | 40 | 44 | 53 |
| 10 | 19 | 23 | 32 | 39 | 45 | 52 | 54 |
| 20 | 22 | 33 | 38 | 46 | 51 | 55 | 60 |
| 21 | 34 | 37 | 47 | 50 | 56 | 59 | 61 |
| 35 | 36 | 48 | 49 | 57 | 58 | 62 | 63 |

IMAGE PROCESSING APPARATUS, METHOD OF CONTROLLING THEREOF, AND PROGRAM

BACKGROUND OF THE INVENTION

1. Field of the Invention

The present invention relates to an image processing method and an apparatus, for forming an electronic album which includes discrimination of a plurality of images.

2. Description of the Related Arts

Input apparatuses that can capture images as digital data such as digital cameras, mobile telephones with photographing function and PDAs, and the like are prevailing widely. And it is possible to take image data generated with such input apparatus into personal computers (PCs), insert them into template image data provided with decoration frames and backgrounds to make electronic albums and display them on television and monitors; etc., and print them out with printers to appreciate.

Conventionally, such image data are stored in a memory apparatus such as memory card and hard disc etc. with a hierarchical structure (folder) and are managed. And, in forming an electronic album, a user selects with its operation a predetermined folder, so that the whole image data included in the folder undergo processing as subjects to be inserted into the template image data. Therefore, in the case where unnecessary image data are present in the folder, a user is required to work on issuance of instruction to select unnecessary image data manually and delete them after he or she appreciates the electronic album.

In addition, as a process on photographed images, proposals described below have been presented.

At first, Japanese Patent Application Laid-Open No. 2001-194575 proposes that an image inputting apparatus determines whether or not blurring has occurred at the time of photographing to proceed with blurring correction prior to storing the photographed images. Moreover, also at the time when the image inputting apparatuses implement focus detection, detection of blurring is proposed.

In addition, Japanese Patent Application Laid-Open No. 2002-304628 proposes that a client server system which detects a desired image from image database storing a plurality of images, calculates feature amounts of all the stored images in advance, calculates a degree of image similarity on the basis of those features amounts and the feature amount of image to be searched for and determines the searched subject images.

Japanese Patent Application Laid-Open No. 2003-87442 proposes detection of exposure, location of an object and blur from image data to evaluate image quality in order to notify a user of his level of photographing skills and assist him/her in improving his/her photographing skills.

Normally, since all the photographed images are stored in the same folder, the folder will include, in its inside, images, that a user would not like to appreciate, such as failed images due to photographing mistakes such as blurring, a plurality of similar images due to rephotographing, and images based on of pixel amounts, compression percentage and print sizes etc. inclusive of characteristics of inputting apparatuses. Therefore, it is not desirable that the whole image data in the selected folder could be subjects to be included in an electronic album without any condition.

In addition, in case of forming an electronic album by automatically inserting image data into template data in accordance with conditions such as an order of photographing date and time, since features etc. of image data are not conventionally taken into consideration in particular, in the case where image frames of a plurality of sizes were present, for example, in the template data, images that are not suitable to appreciate them as large (for example, blurred images) could be inserted into large image frames. Accordingly, at the time of forming an electronic album, a user is required to confirm individual image data in a folder to pick and choose.

In addition, the above described prior art presents problems as follows.

Japanese Patent Application Laid-Open No. 2001-194575 discloses an electronic camera having blur detection means for detecting values on blurring and blur correction means. This camera is arranged so that a photographing input equipment detects blur in an input photographing equipment at the time of its image taking and makes correction so as to cancel the blur physically. Also in an input equipment with such a blurring correction function, if the absolute amount of blur exceededs a detection discrimination value or correction limit value, it will become unresolvable. In addition, in case of an input apparatus without such a function is originally unresolvable. Moreover, means for detecting and discriminating blur on images that have once recorded as image data is not disclosed.

In Japanese Patent Application Laid-Open No. 2002-304628, subject to expanding of image data, area division is implemented, and color separation is implemented on area basis to calculate feature amounts, and the calculated feature amounts are stored in association with images. And then, sequentially comparing feature amounts of a subject image of similarity discrimination with feature amounts stored in association with individual images stored and managed in a database, images having short inter-image distance are discriminated to be similar. In that method, after expanding a compressed image, the feature amount data are required to be calculated on designated area basis and color component basis. Therefore, information processing amount and used memory area will increase and it appears to be difficult to actually use an apparatus such as an incorporated apparatus etc. that are poor in resources such as information processing capacity and memory etc.

In Japanese Patent Application Laid-Open No. 2002-304628, it is an object thereof to evaluate image quality with analysis on exposure, position of a subject, balance and a out-of-focus state etc. so as to discriminate image quality to be good or bad. However, a method of utilizing the evaluation result is limited to displaying and advice of the evaluation result to the photographer. Although image improvement on photographing in the future is expected, treatment of already photographed images that have become evaluation subjects and a reflection method of how to reflect the treatment in an album and the like are not notified to the photographer at all, and therefore the evaluation result cannot be reflected onto utilization of the already photographed images.

SUMMARY OF THE INVENTION

An object of the present invention is to provide an image processing apparatus as well as a method of controlling it that can solve the above described problems of the prior arts.

Another object of the present invention is to provide an image processing apparatus as well as a control method thereof that can detect characteristics of an input image without expanding the image data that have been compressed and stored.

In order to attain the above described objects, a blurring discriminating method of the present invention, comprises the steps of extracting compressed data from an image compression file, analyzing a feature of the data extracted in said extracting step, and discriminating whether a photographing state of an image of the image compression file is a blurring state, on the basis of an analysis result in said analyzing step.

In addition, in order to attain the above described objects, a blurring discriminating method of the present invention, comprises the steps of inputting image data provided by dividing image data into blocks on a plurality of pixels basis and compressing it on the block basis, detecting an image compression conversion characteristics of each of the blocks of the image data input in said inputting step, calculating a feature amount on the basis of the image compression characteristics detected in said detecting step, and discriminating whether the image data input in said inputting step is of a blurring state, on the basis of a calculation result in said calculating step.

Further, in order to attain the above described object, a blurring discriminating apparatus of the present invention, comprises extracting means for extracting compressed data from an image compression file, analyzing means for analyzing a feature of the data extracted by said extracting means, and discriminating means for discriminating whether a photographing state of an image of the image compression file is a blurring state, on the basis of an analysis result by said analyzing means.

Still further, in order to attain the above described object, a blurring discriminating apparatus of the present invention, comprises inputting means for inputting image data provided by dividing image data into blocks on a plurality of pixels basis and compressing it on the blocks basis, detecting means for detecting an image compression conversion characteristics of each of the blocks of the image data input by said inputting means, calculating means for calculating a feature amount on the basis of the image compression characteristics detected by said detecting means, and discriminating means for discriminating whether the image data input by said inputting means is of a blurring state, on the basis of a calculation result by said calculating means.

Other features and advantageous of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 2 is a drawing of exemplifying an AC component arrangement of luminance data (post-DCT) according to the present invention;

FIG. 14 is a drawing of exemplifying setting item selection screen displayed in an image processing apparatus according to the present invention;

FIG. 17 is a table of showing main information items included in an image file according to the present invention;

FIG. 18 is a table of showing sub-information items included in an image file according to the present invention;

FIG. 29 is a drawing of showing a result of block discrimination implemented onto the image in FIG. 6 according to the present invention;

FIG. 30 is a drawing of showing a result of block discrimination implemented onto the image in FIG. 8 according to the present invention;

FIG. 31 is a drawing of showing a result of block discrimination implemented onto the image in FIG. 10 according to the present invention;

FIG. 32 is a drawing of showing a result of block discrimination implemented onto the image in FIG. 19 according to the present invention;

FIGS. 40A, 40B and 40C are drawings of exemplifying tables for image quality evaluation used according to the present invention;

FIG. 42 is a drawing showing a configuration example of a quantization table according to the present invention.

DETAILED DESCRIPTION OF THE PREFERRED EMBODIMENTS

As follows, embodiments of the present invention will be described with reference to drawings.

Figure 11:
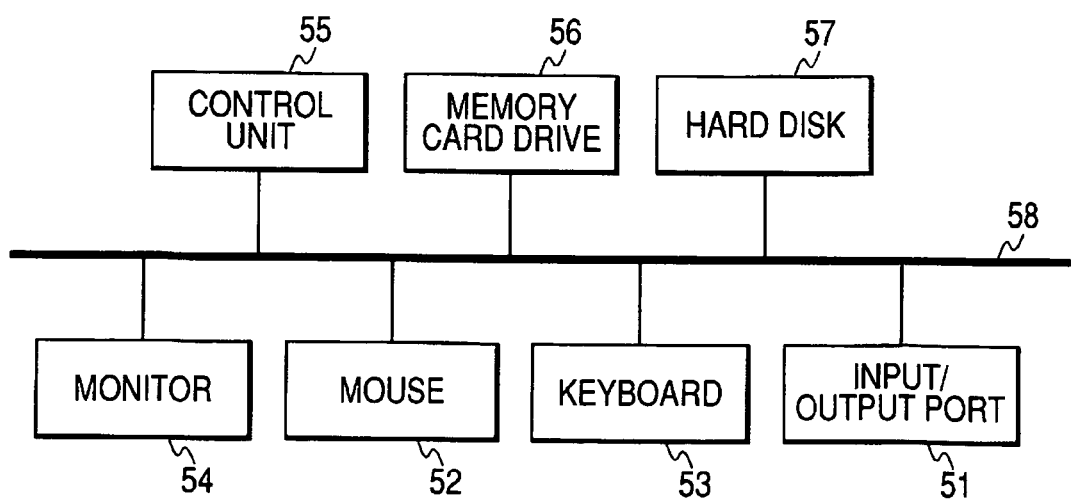
FIG. 11 is a block diagram showing a hardware configuration example of a system to which an image processing apparatus according to the present invention has been applied.

FIG. 11 is a schematic block diagram showing a configuration of a system to which an image processing apparatus according to a first embodiment of the present invention has been applied.

As shown in FIG. 11, the system according to the present embodiment can be realized with a configuration of a general-purpose computer being distributed on the market as so-called personal computer.

Specifically, provided are an input/output port 51 to/from which data are inputted/outputted, a mouse 52 being a pointing device, a keyboard 53 for inputting numerical values and characters etc., a monitor 54 for implementing a variety of displaying, a control unit 55 for controlling operations of the whole apparatus, a memory card drive 56 for reading/writing data from/into memory cards, a hard disk 57 for storing data as well as programs and a bus 58 connecting respective units.

As the monitor 54, any one of a liquid crystal monitor, a CRT monitor, an EL display, a plasma display and a television receiving set, for example, can be used. Moreover, a so-called touch panel comprising respective functions of the mouse 52, the keyboard 53 and the monitor 54 may be also used.

Control unit 55 includes, for example, a CPU, a ROM, a RAM etc., executes control programs stored in the hard disk 57 or the ROM and thereby, based on inputs from the mouse 52 and the keyboard 53, implements respective kinds of processing onto the image data read out with the input/output port 51 or the memory card drive 56. In the hard disk 57, a plurality of image files are being managed in utilization of hierarchical structure (folders). In addition, in the hard disk 57, template data are managed. Here, the control unit 55 inserts image data into the template data and thereby makes album data. And, rendering processing based on the album data is executed so that an electronic album is displayed on the monitor 54.

In the present embodiment, a case of the image processing system having been realized with a personal computer (PC) is described, but it goes without saying that the system is also realizable with any apparatus or system capable of attaining likewise functions such as multi-function printers, photo direct printers etc. other than personal computers. In addition, in the following description, a case where image processing of the present embodiment has been applied to an album application will be described, but it is also applicable to not only applications of implementing screen display but also the other applications.

The whole flow of album forming processing executed with a system having the above described configuration will be described with reference to a flow chart shown in FIG. 1. In that processing, the control unit 55 of the PC starts up and executes an album application. In addition, the control unit 55 starts the processing in the case where a user operates the mouse 52 and thereby instruction of selecting folder to be treated as subjects has been inputted.

In step S101, a controlling unit 55 implements input processing on setting items at first. In particular, the control unit 55 displays, onto the monitor 54, an input screen for making a user to implement respective kinds of setting. And, the user operates the mouse 52 and the keyboard 53 and thereby obtains a result of the inputted result. FIG. 14 exemplifies items that the user can set in that Step S101.

In the present embodiment, there are four types of setting items. The user can instruct in advance the method of a process of automatically selecting image data to be carried an electronic album. As follows, respective setting items will be described.

1) Similar Image Detection

Similarity in mutually adjacent image data among image data in a folder is discriminated. This item is an item for designating a method of treating of similar image data when similarity has been discriminated as a result of discrimination. A selection item, which can be designated is that whether image data, that have been determined to be deteriorated (inferior in quality) among image data discriminated to be similar, into a region of small of area or not carried on an electronic album. In the present embodiment, insertion into a region of small area is set as an initial value (default).

2) Blurring Image Detection

It is discriminated whether or not there is any occurrence of deterioration in image quality of image data due to photographing with blurring. This is an item for designating how to treat image data that have been discriminated to incur blurring. A selection item which can be designated is that whether image data, that have been discriminated to be blurred (inferior in quality), is inserted into a region of small area or is not carried on an electronic album. In the present embodiment, insertion into a region of small area is set as an initial value (default).

3) Image Quality Discrimination

Quality of image data is discriminated with difference in quality of image data depending on types of input apparatuses etc., insertion area, size of image data and compressing ratio. This item is an item for designating how to treat image data that have been discriminated to be bad in image quality. A selection item which can be designated is that whether image data, that have been discriminated to be low in quality, is inserted into a region of small area or is not carried on an electronic album. In the present embodiment, insertion into a small region in area is set as an initial value (default).

4) Number of Album Images

Number of pictures of image data that are inserted to template data of one album can be designated. In the present embodiment, an initial value is set to "no designated number of picture". Here, the number of pictures is designated, in accordance with the album application, the control unit 55 selects that image data of that number of pictures from the folder. In that case, in the above described "similar image detection". "blurring image detection" and "image quality discrimination", some images to be discriminated to be inferior in image quality could be excluded from subjects to be carried on the electronic album in spite of designation of designated handling method in respective setting items.

In Step S102, the control unit 55 obtains image files present in selected/designated folder with user's operations from among the memory card drive 56 reading out image data recorded on the memory card as described in the apparatus configuration in FIG. 11, the hard disk 57 in which photographed image data are already stored, and the like.

In relation to the amount of resources included in the control unit 55 (storage capacity etc. of the RAM), in the case where some of the obtained image files cannot be read in, at least information required for editing work such as number of images of the subject and least required but indispensable image files are read in.

Here, as information being necessary for editing, photographing information of an image is nominated. For example, there are Exif data recorded in an image file.

Figure 16:
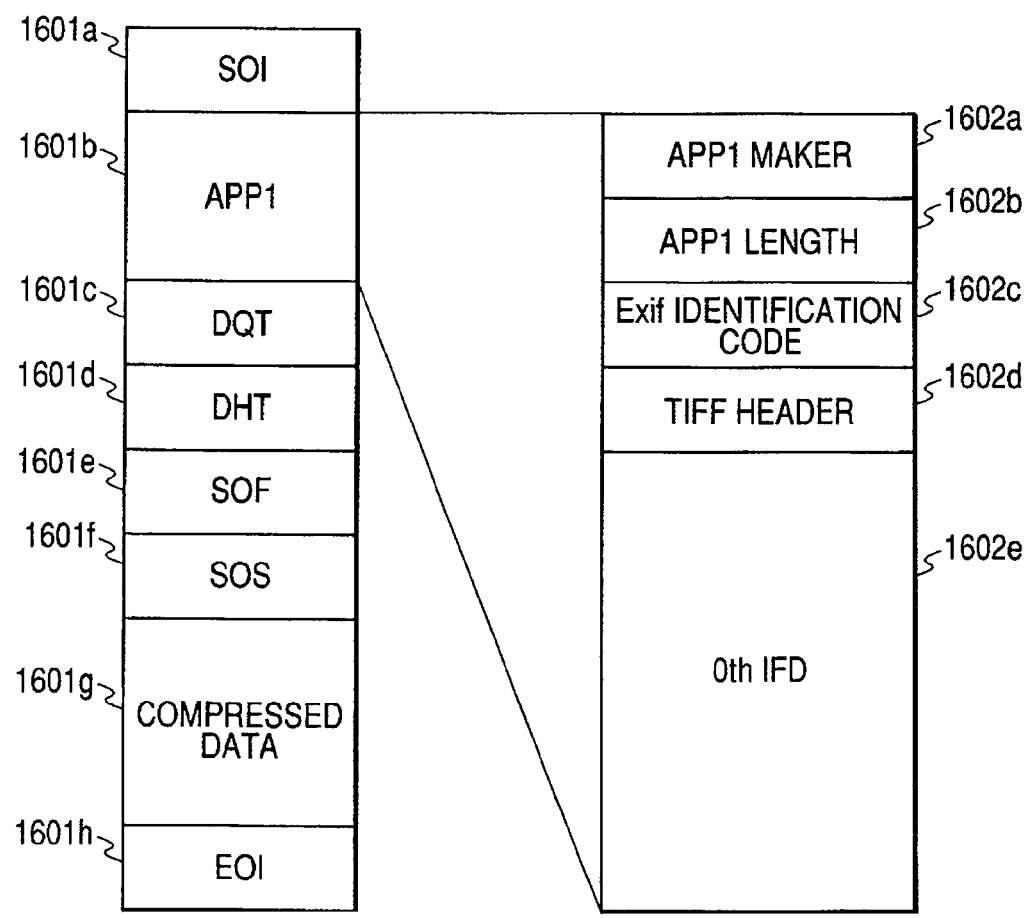
FIG. 16 is a drawing of showing a structure of an image file according to the present invention.

FIG. 16 is a drawing of showing a structure of an image file in the present embodiment. The structure of an image file is in compliance with the DCF format and contains thumbnail image data and Exif data such as date and time of photographing etc. embedded therein. Therefore, images can be appreciated in use of a browser application of the Internet, an image viewer and photo-retouching software etc.

An image file has, as shown in a portion at the left side in FIG. 16, a configuration in which there come an SOI (Start of image/0xFFD8) 1601a at first, subsequently an APP1 (1601b), subsequently a DQT (Define Quantization Table) 1601c, subsequently a DHT (Define Huffman Table) 1601d, subsequently an SOF 1601e, subsequently an SOS (Start Of Frame) marker 1601f, subsequently a compressed data (data) 1601g being the main body of image data and subsequently an EOI (End of Image) 1601h.

Among markers used for image files (Maker), markers from 0xFFE0 to 0xFFEF are called application markers, and they are not required for decoding the image files, but are defined as data area to be used in respective application programs. The photographed image data etc. are stored inside the image files and therefore a marker called an APP1 (0xFFE1) is used. In addition, the structure of "APP1" is as shown in the portion at the right side in FIG. 16.

That is, as for the structure of "APP1", at first an APP1 Maker (FFE1/2 byte) area 1602a comes at the top, subsequently an APP1 Length (2 byte data representing the size of the APP1 area) area 1602b comes and then an APP1 data area: 1602c comes. In the Exif identification code succeeding this APP1's data area 1602c, "Exif" in ASCII character comes as an identifier, and subsequently two-byte 0x00, totaling 6 bytes, and therefrom Exif data are stored in Tiff (Tagged Image File Format) format.

The first 8 bytes in Tiff format will become Tiff header (Header) area 1602d and the first 2 bytes define the format of byte arrangement. 0x4d4d: "MM" stands for a Motorola format, 0x4949: "II" stands for an Intel format. The first IFD (Image file directory) is stored into 0th IFD (IFD of main image) area 1602e succeeding the Tiff header area 1602d.

Normally, the main image data as well as the image related data are confined therein, and description articles are divided into main information, sub-information (Exif SubIFD/ 0x8769) and maker's own information (Maker note/0x927c) for every single description item.

FIG. 17 is a drawing of exemplifying a "tag" address of indicating detailed contents and description of main information. As shown in the above described drawing, as main information, general information such as title, maker name as well as machine type of inputting device, image orientation, horizontal resolution, vertical resolution, resolution unit, software and changed date and time, etc. are described.

FIG. 18 is a drawing of exemplifying a "tag" address for indicating described contents and description of sub-information. As shown in the above described drawing, as sub-information, detailed information of the inputting device such as light source and lens focal length, etc. and various kinds of conditions of photographing such as exposure time F-value, ISO sensitivity and auto exposure photometry mode, etc. are described.

Photographing related data 1602b in the present embodiment are described inside the "APP1" area 1601b. Photographing related information is described in the sub-information in FIG. 18, but without being limited thereto, effective information is described in the main information in FIG. 17 as well.

Now back to FIG. 16 again, description will be made. A DQT (Define Quantization Table) 1601c shown in the portion at the left side in FIG. 16 defines the entity of a Quantization Table and a DHT (Define Huffman Table) 1601d defines the entity of a Huffman Table respectively, in addition, an SOF (Start Of Frame) 1601e indicates start of the frame and an SOS (Start of stream) marker 1601f indicates start of image data and an EOI (End of image/0xFFD9) respectively.

Here, an example of deriving information required for editing work from the Exif data, but otherwise it also can be considered to be obtained from information described in a meta file as image-attached information such as DIG (Digital Imaging Group) 35 etc.

Similarity Discrimination Processing

Figure 1:
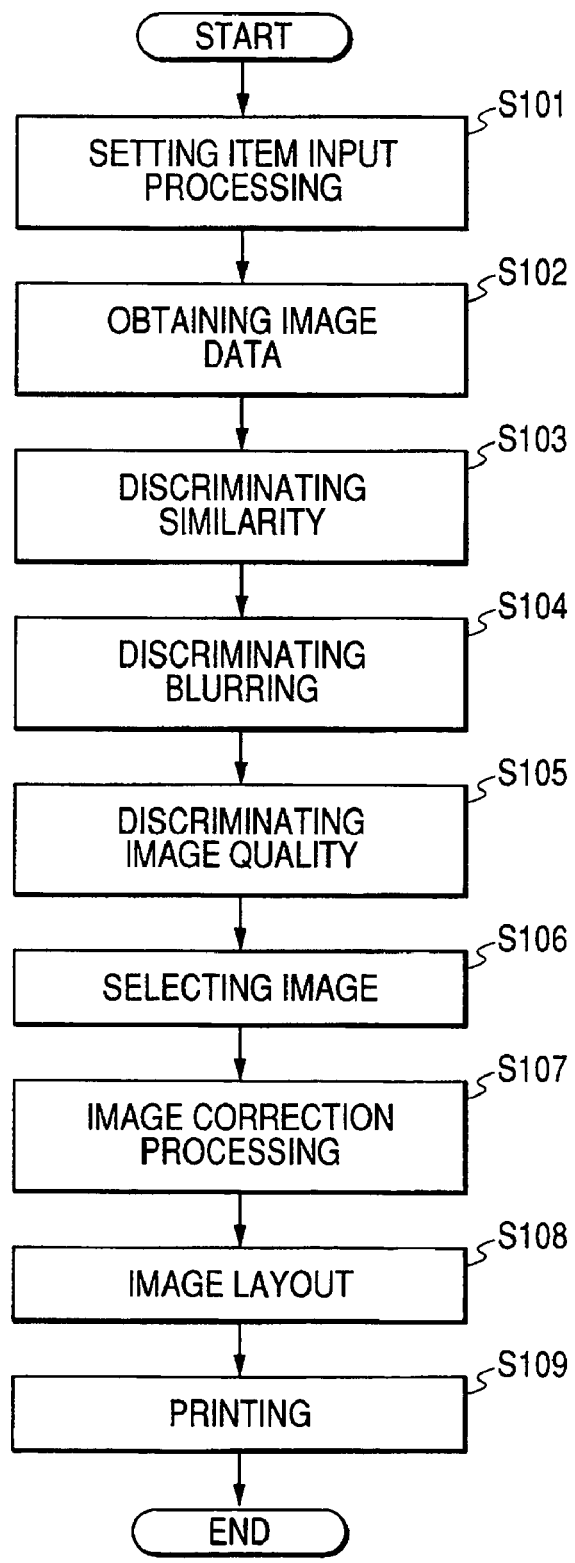
FIG. 1 is a flow chart of showing processing that a control unit of an image processing apparatus according to the present invention executes.

Now back to FIG. 1, in Step S103, the control unit 55 discriminates similarity on image data. In similarity discrimination, it is discriminated whether or not similar images are present among a plurality of image data to be subjected to insertion into the same template data, caused by rephotographing, bracket photographing and continuous photographing. Therefore, among a plurality of image data, which are present in the same folder as the subject image data which are candidates to be carried on the electronic album, image data mutually adjacent in the photographing order will be subjected to comparison.

Figure 22:
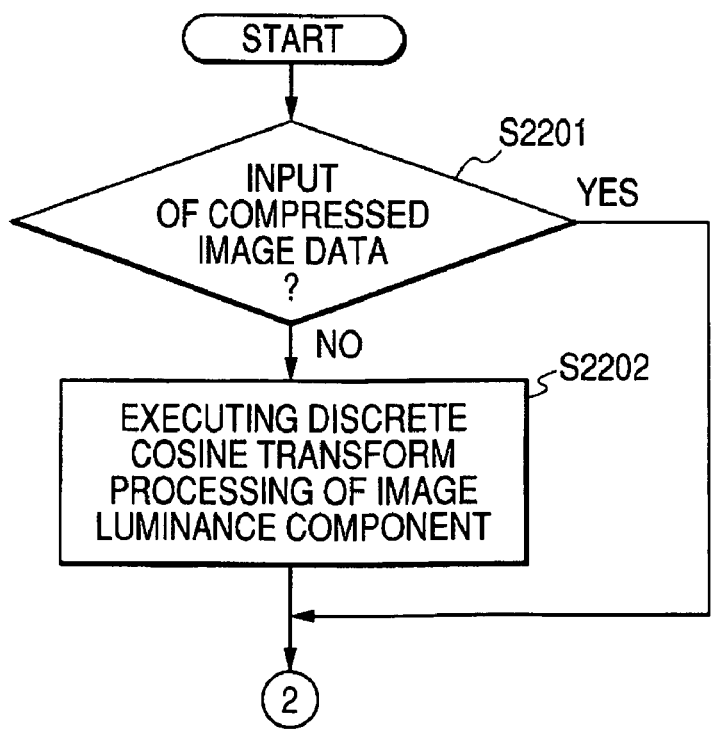
FIG. 22 is a flow chart of showing similarity discrimination processing according to the present invention.

Similarity discriminating process will be described with reference to flow charts shown in FIG. 22 and FIG. 33 to FIG. 35. At first, the process shown in the flow chart in FIG. 22 is to discriminate whether or not the image data satisfies conditions required for implementing discrimination and, in the case where the required conditions are not satisfied, such a process to satisfy the required conditions is implemented.

In Step S2201, it is discriminated whether or not the image data to be subjected discrimination are of a compressed image file format. If so, the step goes forward to a process shown in FIG. 33. In case of not being of a compressed image file format, the step goes forward to Step S2202 to implement DCT (discrete cosine transform) on the image luminance component required for the similarity discrimination. After transform processing, the step goes forward to processing shown in FIG. 33.

The DCT in Step S2202 is a transform to be carried out in a generating process of a compressed image file at the time when pixel information in the whole image area is transformed into spatial frequency components at 8×8 pixel unit blocks.

FIG. 2 is schematically showing data after the luminance data have undergone DCT on one of 8×8 pixel unit blocks, where the portion "0" is luminance average which is a direct current component of the 8×8 pixel unit block and the other "1" to "63" are AC components (alternate components), which are arranged in the order from low to high spatial frequency. The JPEG format is a coding system for compressing the file size by applying data compression onto high frequency components among them.

Figure 33:
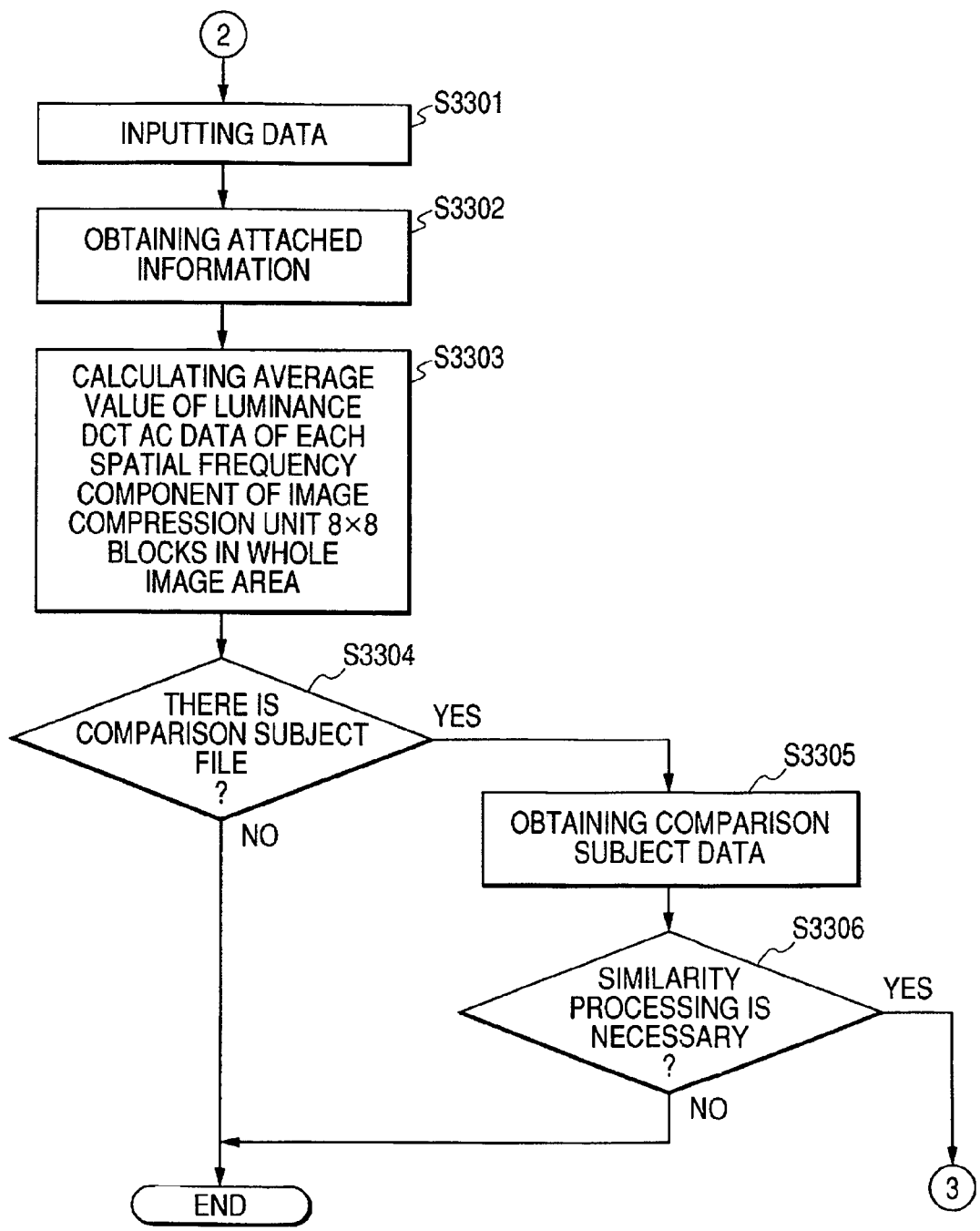
FIG. 33 is a flow chart of showing similarity discrimination processing according to the present invention.

Moving on to FIG. 33, in Step S3301, among image data to be subjected to discrimination, at least luminance data by provided DCT during compression process are read in. In Step S3303, related information attached to image data to be subjected to discrimination is read in. In Step S3303, an average value in the whole image area is calculated on each AC component (alternate current component) "1" to "63" of each 8×8 image block.

Figure 5A:
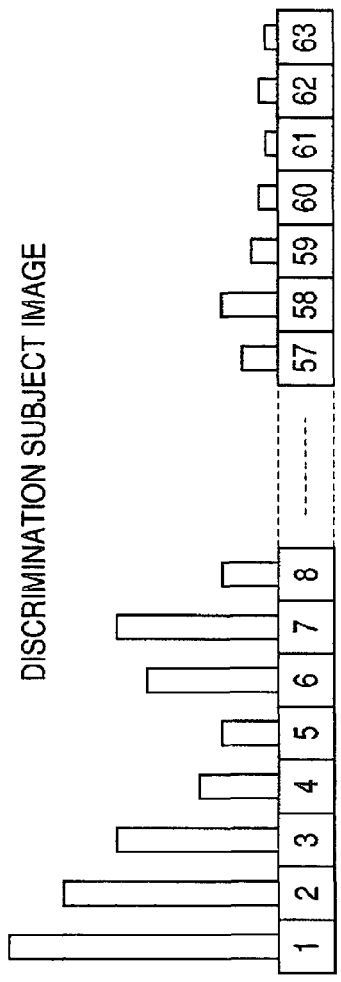
FIGS. 5A, 5B and 5C are drawings of describing a principle of similar image discrimination according to the present invention.

A sample image is not shown in the drawing, but if calculation results are shown in a schematic fashion, a bar graph for "discrimination subject image" in FIG. 5A will be derived. In Step S3304, it is discriminated whether or not a comparison subject file (simply, the other files being in a folder and having not yet undergone comparison) is present. As a result of discrimination, in case of no image file being present to be compared with, the similarity discrimination processing is over and the step goes forward to the subsequent Step S104 in FIG. 1). In case of a file being present to be compared with, the step goes forward to Step S3305.

In Step S3305, among image data to be subjected to comparison, at least luminance data having undergone DCT and attached information that is present are read in. In Step S3306, it is discriminated whether or not a similarity discriminating process is required between the two parties of a discrimination subject image and a comparison subject image file.

Figure 36:
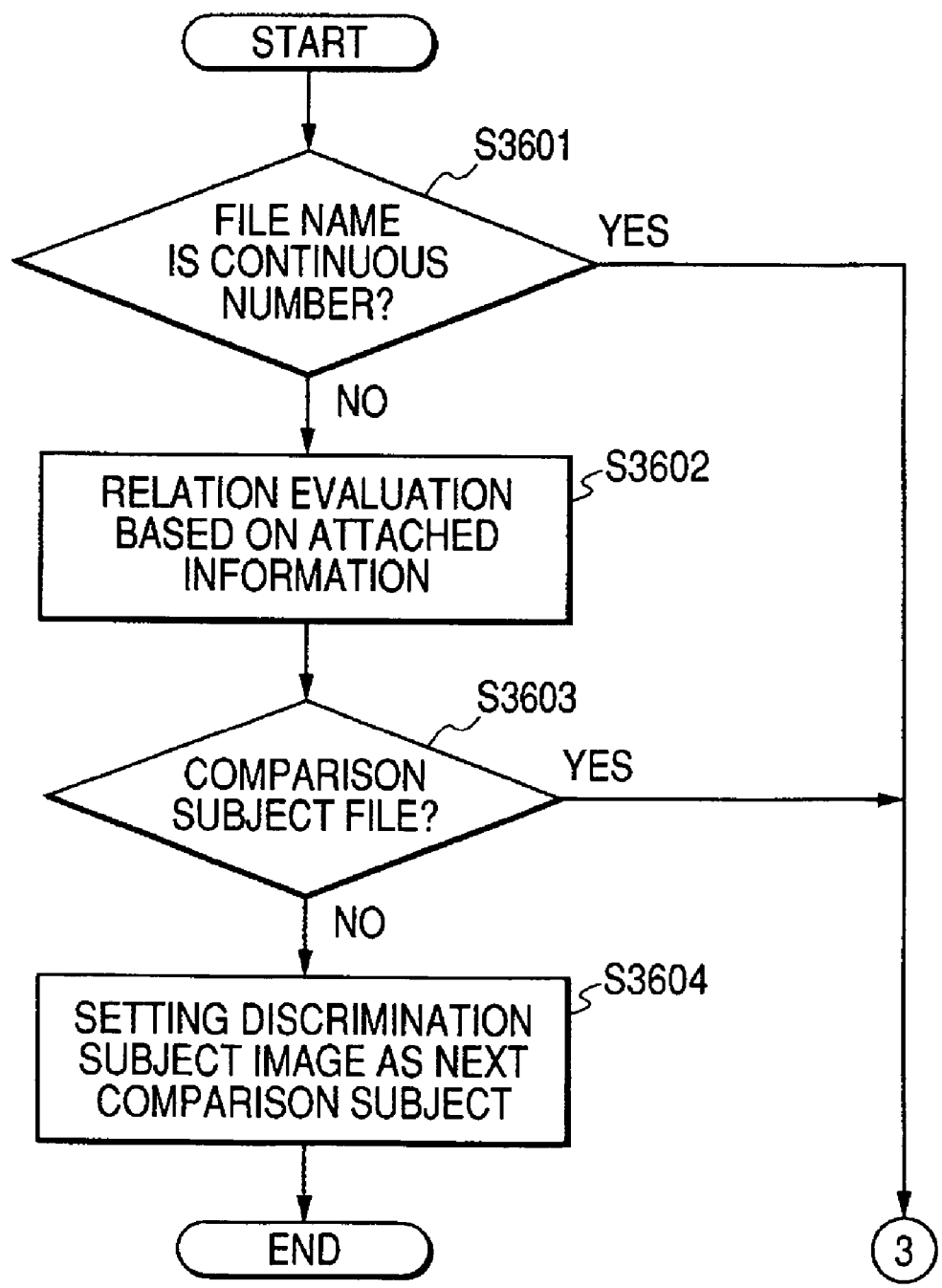
FIG. 36 is a flow chart of describing similar image discrimination processing according to the present invention.

Details of the discrimination in Step S3306 will be described with reference to a flow chart in. FIG. 36. In Step S3601, it is discriminated whether or not file names of the two parties of the discrimination subject image and the comparison subject image file are continuous numbers. In case of continuous numbers, the similarity discriminating process is discriminated to be required, and the step goes forward to the process 3 in FIG. 34.

In the case where the file names of two parties are not continuous numbers, the order of photographing is determined to be not adjacent and the step goes forward to Step S3602. Here, information such as main information and sub-information, etc. which are photographing related data of image files described above is obtained to evaluate relation.

Specifically, evaluation is implemented based coincidence as well as relation with the following items.
(Main Information)
Machine type: 0x0110
Horizontal resolution: 0x011a
Vertical resolution: 0x011b
(Sub-Information)
Exposure time: 0x829a
Photographing data and time: 0x9003
Flash: 0x9209
Image width: 0xa002
Image height: 0xa003

In evaluation, comprehensive coincidence is not a condition. For example, a photographing time is evaluated as to whether or not it falls within a range of a particular threshold value such as difference within 5 minutes. In addition, in case that the designated number of images is designated as described in FIG. 14, it is also possible to cause the threshold value to change to change evaluation reference so as to match with the designated number of images at the last.

In Step S3603, with evaluation based on the attached information, it is discriminated whether or not the data are a comparison subject. In the case where they have been discriminated as a comparison subject file, the step goes forward to the process 3 shown in FIG. 34. In addition, in the case where they have not been discriminated as a comparison subject by discrimination with the attached information, the step goes forward to Step S3604, the discrimination subject image is set as a next "similarity comparison image" for a subsequent input image and similarity discrimination process is terminated and the step goes forward to processing of the next Step S104.

Figure 5B:
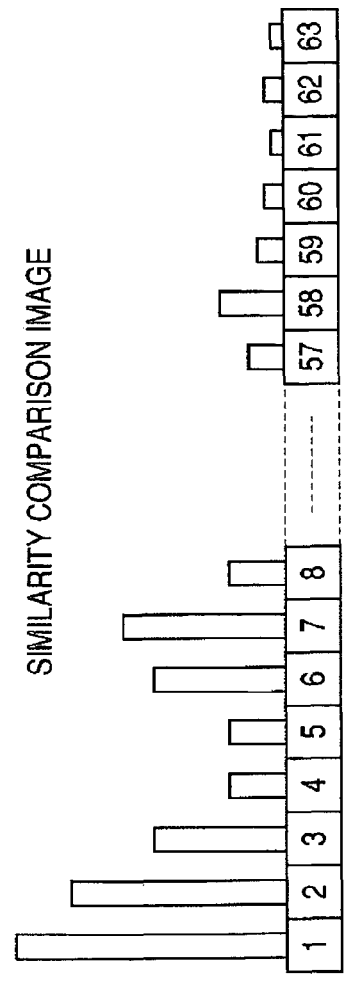
Figure 34:
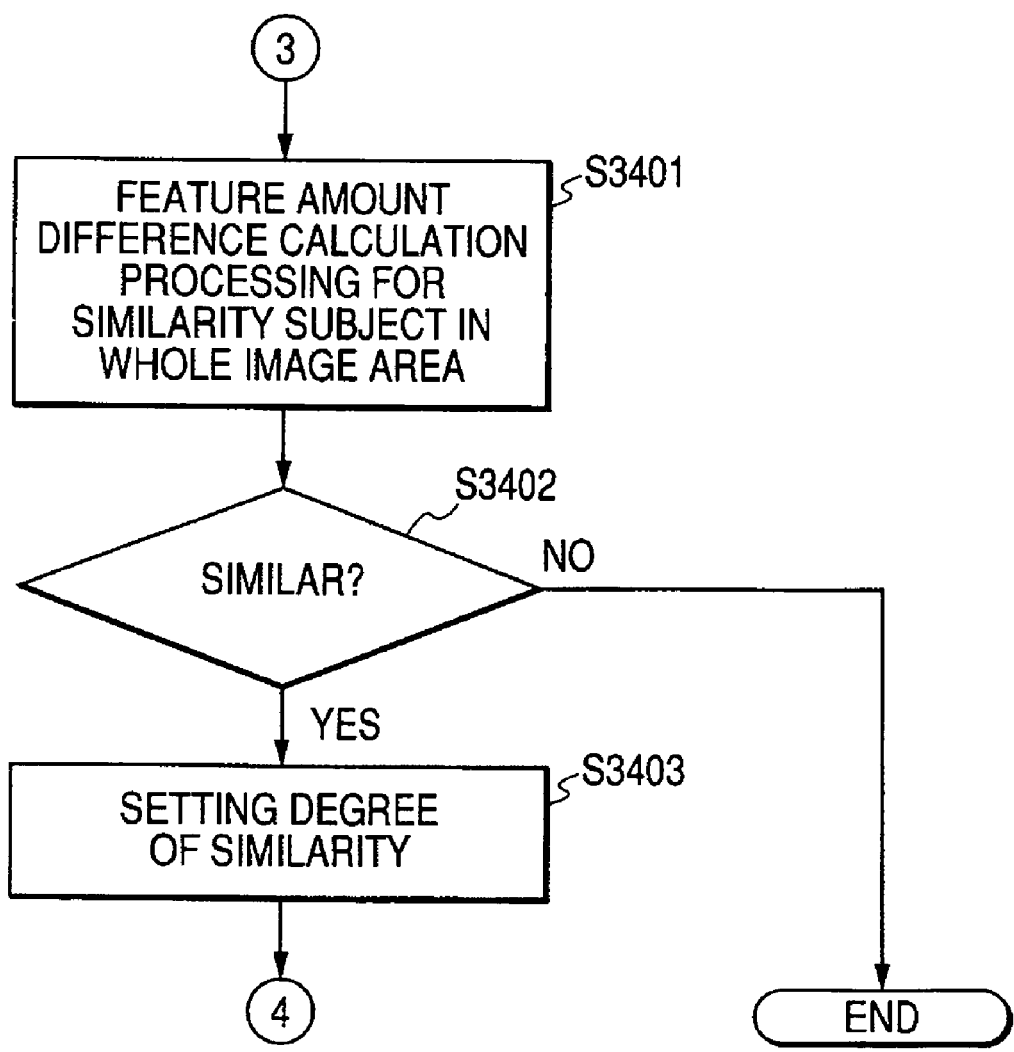
FIG. 34 is a flow chart of showing similarity discrimination processing according to the present invention.

With reference to a flow chart in FIG. 34, succeeding portions of similarity discrimination processing will be described. In Step S3401, also for the prior "similarity comparison image", an average value for each AC component (alternate current component) "1" to "63" of each 8×8 pixel block in the whole image area is calculated. Calculation results are shown schematically in "similarity comparison image" in FIG. 5B.

Figure 5C:
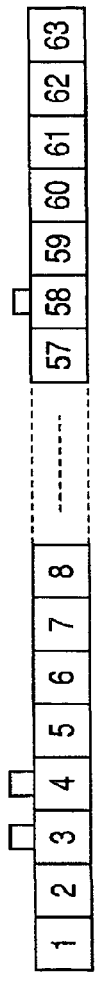

Thereafter, the AC component average values of discrimination subject image calculated in Step S3303 (FIG. 5A) are brought into subtraction on each component so that difference calculation is implemented. The results of difference calculation are shown schematically in FIG. 5C. Those differences of respective frequency components are all summed and are compared with the threshold value for similarity discrimination having been set into multi-stages in advance. And from the comparison results, the degree of similarity between two image data is determined with each threshold value.

Here, particular threshold values will not be specifically described, but can be determined appropriately. In addition, in case that the number of album images is designated, it is also possible to cause the threshold value to change to change the discrimination reference so that the discrimination results will get close to the designated number of images.

In Step S3402, similarity discrimination is implemented with degrees of similarity. For example, in the case where a degree of similarity is less than a predetermined degree of similarity and no similar image is discriminated, the similarity discrimination, processing is terminated and the step goes forward to the subsequent step S104. On the other hand, in case of similarity being discriminated, the step goes forward to the subsequent Step S3403.

Figure 35:
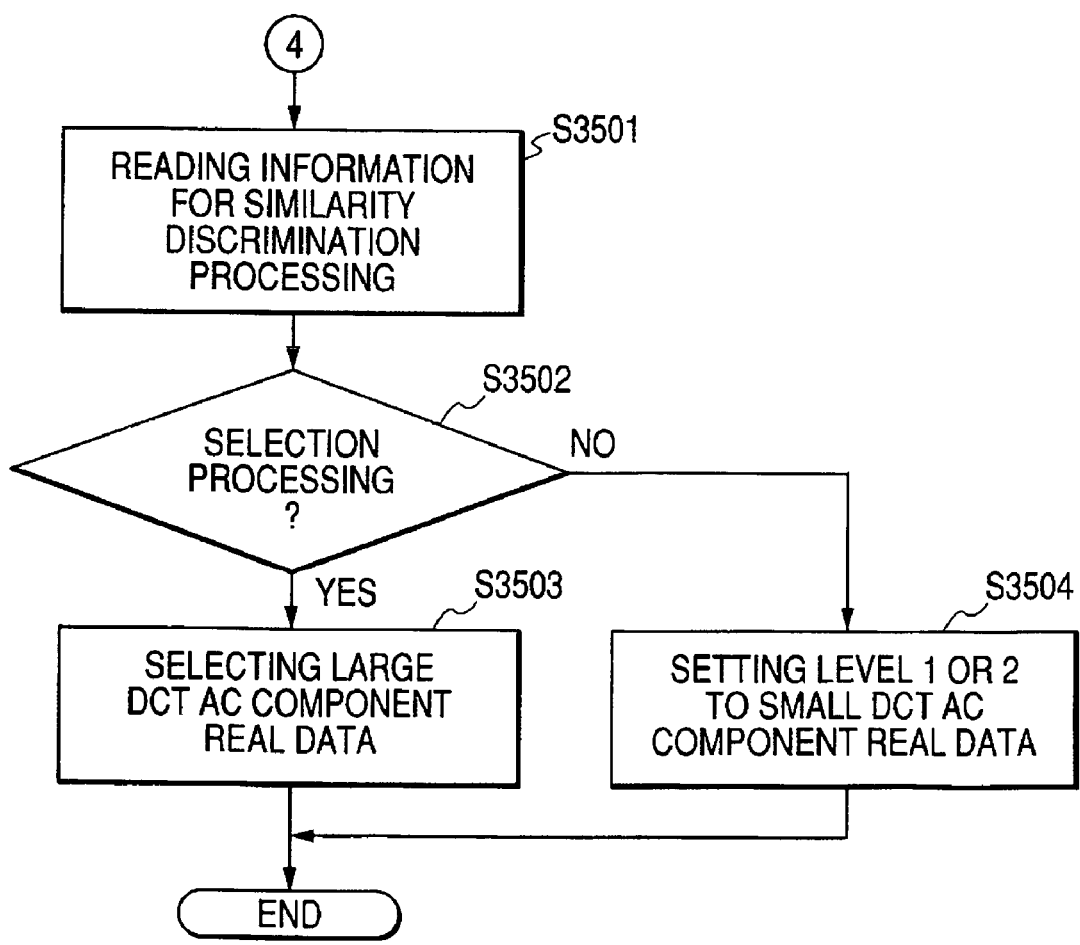
FIG. 35 is a flow chart of showing similarity discrimination processing according to the present invention.

In Step S3403, the degree of similarity determined in Step S3401 is set, and the step goes forward to the process 4 shown in a flow chart in FIG. 35. In Step S3501 in FIG. 35, information required for discrimination such as a degree of similarity determined before, information on selection of similarity discrimination processing implemented in the initial setting or layout designation and information on setting the number of images to album etc. are read in.

In Step S3502, it is discriminated whether or not the image data having undergone similarity discrimination has a large degree of similarity. As a result of determination, the following processing will be taken. In Step. S3503, among similarity image data, image having high quality are selected and secured while the rest of similar image data with low image quality are deleted from the group of candidates to be carried onto the electronic album. For determination reference since the image having the larger total sum of average values on the AC components (alternate current components). "1" to "63" of each 8×8 pixel blocks in the whole image area used for the prior similarity discrimination is abundant in data amount on spatial frequency feature, and therefore, such an image is determined to be an well-focused image with high image quality among similar images.

Besides the above described discrimination, not with the total sum of AC components. (alternate current components) "1" to "63", but with the total sum of high frequency area components of the number greater than a predetermined number, discrimination can be implemented. After selection is determined, the result is set and the similarity discrimination processing is terminated.

In Step S3504, the low level is determined and set so that, for the image data that have been discriminated to be low in image quality with the high image quality discriminating method in Step S3503, the image with higher degree of similarity will be inserted into the region with smaller area in the electronic album. The control unit 55 associates the respective image data with the level of discriminated degree of similarity to manage them with the RAM or the hard disk.

On the other hand, since images with low degree of similarity have low similarity of distribution feature of spatial frequency, comprehensive evaluation with the attached information, utilizing. DCT information of compressed data in order to discriminate degree of similarity will enable discrimination of degree of similarity with less load of processing.

Blur Discrimination Processing

Now back to FIG. 1, in Step S104, the control unit 55 performs discrimination of blurred images on image data. The blurring discrimination to be implemented there is to analyze a feature amount of image data photographed with an input apparatus and stored as a data file to discriminate whether or not the photographed images are in a sate of blurring. Blurred images deemed to be failed images due to mistakes in photographing are detected to be utilized as information for determination whether or not the images should be carried on the electronic album or should be located in what size of area in the electronic album. In addition, usage as a reference of selection determination at the time of discriminating similarity in Step S103 may be considered, but in case of the present embodiment, discriminating blurring of respective independent images will be described.

As follows, blurring discrimination processing will be described with reference to flow charts shown in FIG. 22 to FIG. 28. Also in blurring discrimination processing, likewise the similarity discrimination processing, in order to also use the data provided by DCT of the compressed images as feature amount for discrimination, at first, processing in FIG. 22 is implemented and a subject image file is confirmed.

Figure 23:
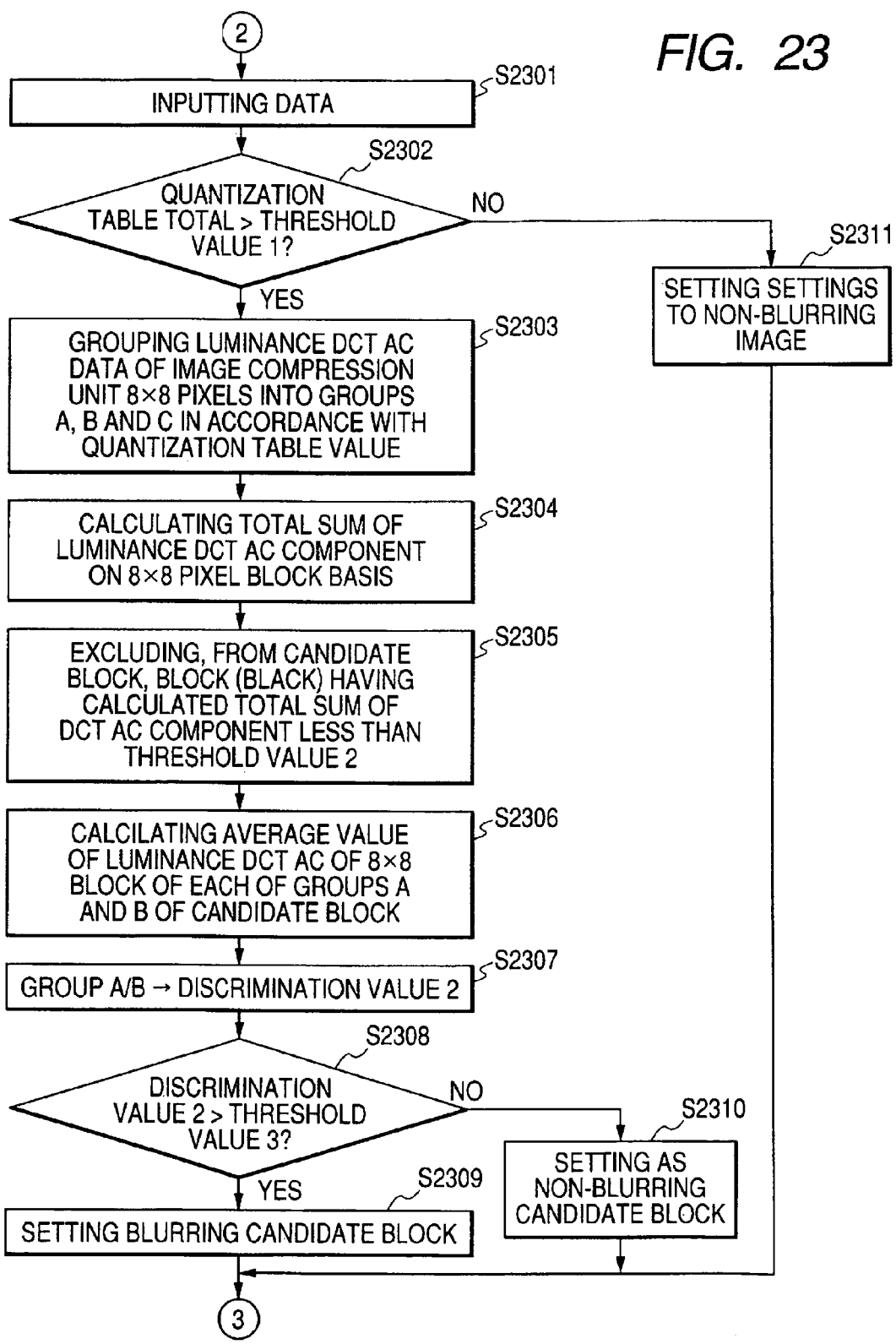
FIG. 23 is a flow chart of showing similarity discrimination processing according to the present invention.

And, in blurring discrimination processing, substantially to the processing flow in FIG. 22, the process 2 shown in the flow chart in FIG. 23 is implemented. In Step S2301, among image data to be subjected to discrimination, at least luminance data in a compressed process by DCT and data corresponding to quantization table value are read in. In Step S2302, values of quantization table used in data compression of compressed images to be subjected to blurring detection discrimination detected.

Configuration of the quantization table is for 8×8 being JPEG compression unit as shown in FIG. 42, and a compression designating value to DC components is filled in in the upper left portion of "0" item, and compression designating values for respective 1 to 63 item values are filled in in the order from low to high spatial frequency of AC data which are spatial frequency components by DCT. Features of the quantization table are set so as to round the data values of the portions with high spatial frequency components in view of a characteristic that human visual characteristic is more obtuse to high spatial frequency components than to low spatial frequency components at the time of compressing data. Such a quantization table will enable decrease in data amounts without affecting image quality substantially. However, when this rounding is too extensive, deterioration will appears to be visible.

In addition, in accordance with the present invention, data rounding to too much extent could obstruct accurate discrimination since data distribution, data disposition and the like in the spatial frequency levels is used as feature amount for discrimination. Therefore, images for which a quantization table with the total sum of quantization values exceeding a predetermined "threshold value 1" is used are determined to affect the feature amount.

In the present invention, the case where the value of addition of respective values of the quantization table is larger than 1200 is determined to be a quantization table larger than the threshold value 1. That is, in the present embodiment, the threshold value 1=1200.

Figure 24:
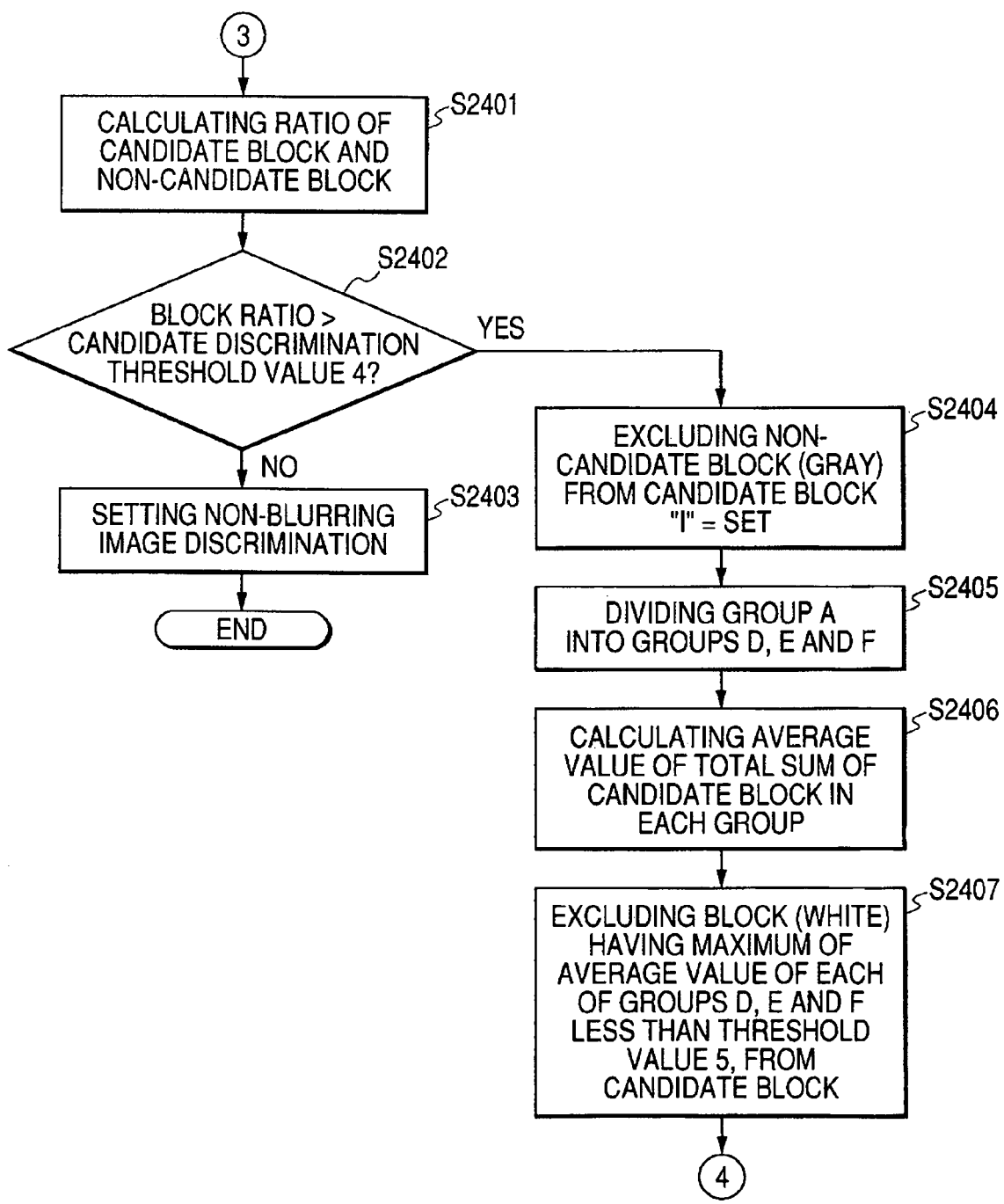
FIG. 24 is a flow chart of showing blurring discrimination processing according to the present invention.

In the case where the total sum of the values of the quantization table obtained in Step S2301 exceeds 1200, the step goes forward to Step S2311 to set the image as non blurring detection subjected image, and the step moves to the process 3 shown in FIG. 24. In addition, in the case where the value of the quantization table is not more than 1200, the step moves to the step S2303.

Figure 3:
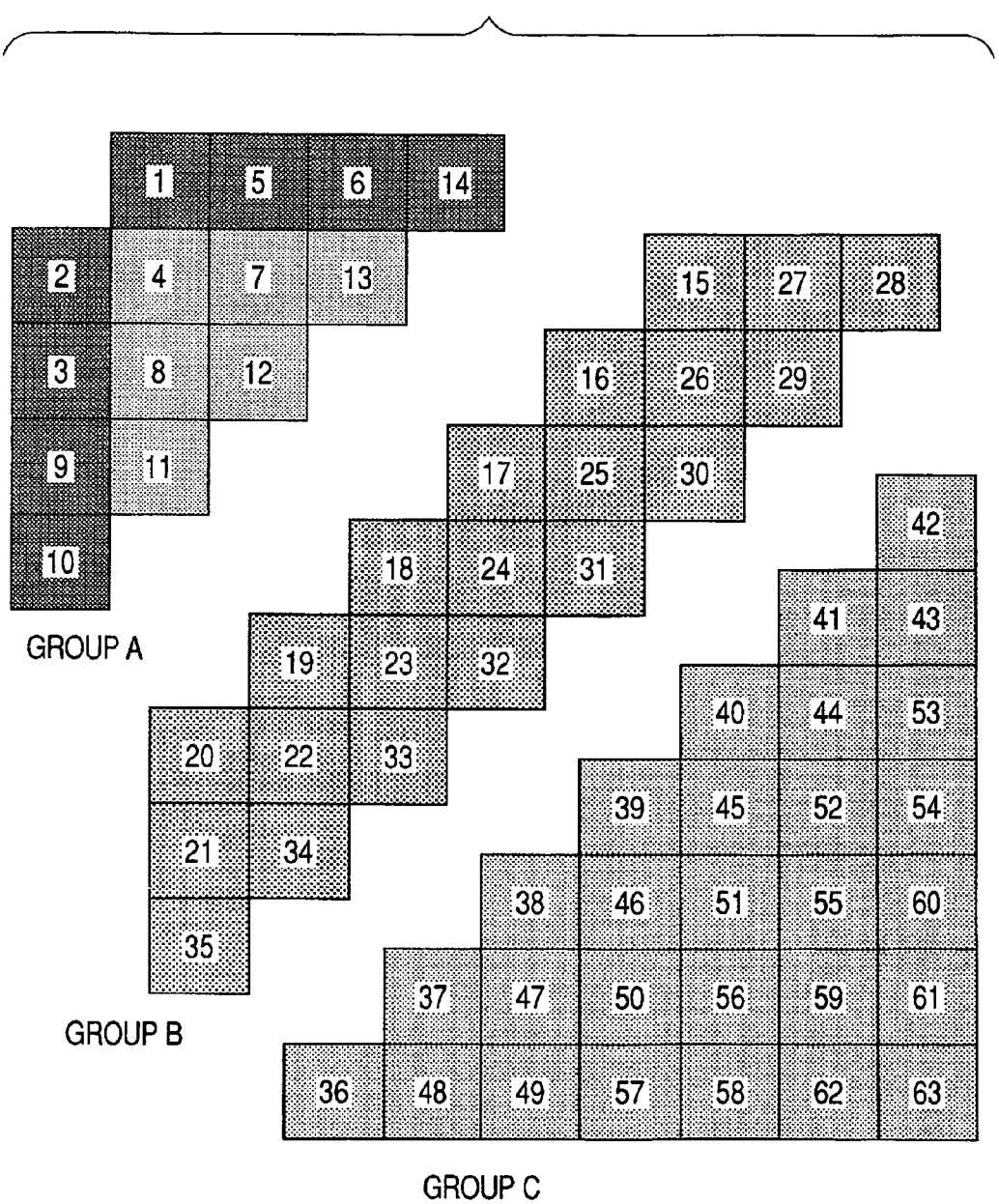
FIG. 3 is an explanatory diagram on an example of grouping of the arrangement in FIG. 2 according to the present invention.

In Step S2303, luminance data provide by DCT during compression process of read-in image data to be subjected to come discrimination are processed on a 8×8 pixel, block basis and as a way of proceeding with analysis on the feature amounts of the block, the luminance data o to 63 are further divided into groups A, B and C mainly based on distribution of the spatial frequency components as shown in FIG. 3.

At first, as concerns setting of the group C, in the case where the total value of the quantization table calculated in Step S2302 is 601 to 1200, it is considered that the image data compression ratio is comparatively high and data of high spatial frequency components are lacking, and therefore the data 36 and thereafter in the DCT AC components are set as the group C. In addition, in the case where the total value of the quantization table is not more than 600, it is determined that comparatively good high spatial frequency component data are present in the image data so that the data 54 and thereafter in DCT AC components are set as the group C.

Basically, the data in the group C area are determined to be data inappropriate for feature amount discrimination. In addition, values from the AC components 1 to 14 are regarded as the group A, and AC components from the component 15 to the spatial frequency component of the group C are regarded as the group B.

Although description on the method of determining the boundary between the group A and the group B is omitted, it is also possible to dynamically set the boundary based on image size and file size. This grouping is set in common to each of the 8×8 pixel blocks of the image.

In Step S2304, the total sum of AC component data subjected to DCT (discrete cosine transform) is calculated as to luminance component on 8×8 pixel block basis in the whole area of images.

In Step S2305, on 8×8 pixel block basis in the whole area of images, the total sum of AC components is compared with the threshold value 2. In the case where total sum of AC components does not reach the threshold value 2, the 8×8 pixel block determined to have less space frequency information will not be used as the feature amount discrimination block thereafter. In order to set this way, the blocks less than the threshold value 2 are set as "black". Details on this processing will be described later.

In Step S2306, average values within the group A and the group B are calculated on the AC components (alternate current components) of each 8×8 pixel block in, the area other than the above described area having been set to "black".

In Step S2307, in accordance with calculation result on each group A and B, "discrimination 2" value derived with the following Equation 1 is calculated for each group.

Group A (Ave)/Group B (Ave)→discrimination 2   (Equation 1)

"Discrimination 2" value is a value for specifying a block having actual data distribution appropriate for detecting feature amounts among 8×8 pixel blocks to be subjected to discrimination.

In Step S2308, comparison of a preset threshold value 3 with "discrimination 2" value is executed on each calculated 8×8 pixel block basis and for the 8×8 pixel block having "discrimination 2" value being not more than the threshold value 3, the step goes forward to Step S2310, to set the block as non-blurring candidate block.

In addition, as for the 8×8 pixel block having the "discrimination 2" value being larger than the threshold value 3, the step goes forward to Step S2309 to set the block as "blurring candidate block". For any case, when setting is over, the processing flow goes forward to the process 3 shown in FIG. 24.

The process 3 shown in FIG. 24 will be described. In Step S2401, in the whole image area, the ratio (block ratio) of "blurring candidate block" and "non-blurring candidate block" which have been already set is calculated excluding the blocks set as "black".

In Step S2402, the calculated block ratio is compared with the threshold value 4 for the preset image candidate discrimination in order to discriminate whether or not the ratio is included in the ratio that might corresponded to a blurring image. In the case where the block ratio is smaller than the threshold value 4, it is determined that blurring image feature cannot be detected from the calculated value of the image, the step goes forward to Step S2403 to set discrimination of "non-blurring image", and moves from the blurring discrimination processing to the subsequent process.

In the case where the block ratio is larger than the threshold value 4, it is discriminated that the candidate is highly possible to be a blurring image under discrimination using the present feature amount and the step goes forward to Step S2404. That discrimination is based on that high spatial frequency components of the blurring image are apt to decrease although the discrimination is strongly affected by blurring amounts.

In Step S2404, the block set as "non-blurring candidate block" in Step S2310 is set to be excluded from the candidate block so as not to participate in the discrimination in the future. That is, the blocks having been set to be excluded from the candidate block are set as "gray".

Until the above described discrimination processing, the block has been determined to satisfy blurring feature amount for the ratio of high and low the spatial frequency appearing in blurred images, hereinafter, discrimination on whether or not a particular orientation occurring in blurring is satisfied will be proceeded. In accordance with presence or absence of orientation including consideration of spatial frequency distribution, blurring discrimination and blurring direction are determined.

In Step S2405, the group A in the candidate block is divided into three groups of a group D, a group E and a group F.

The group A in FIG. 3 is a post DCT AC components in luminance data, and numbers 1 to 14 are given thereto from the lower spatial frequency component.

Figure 4:
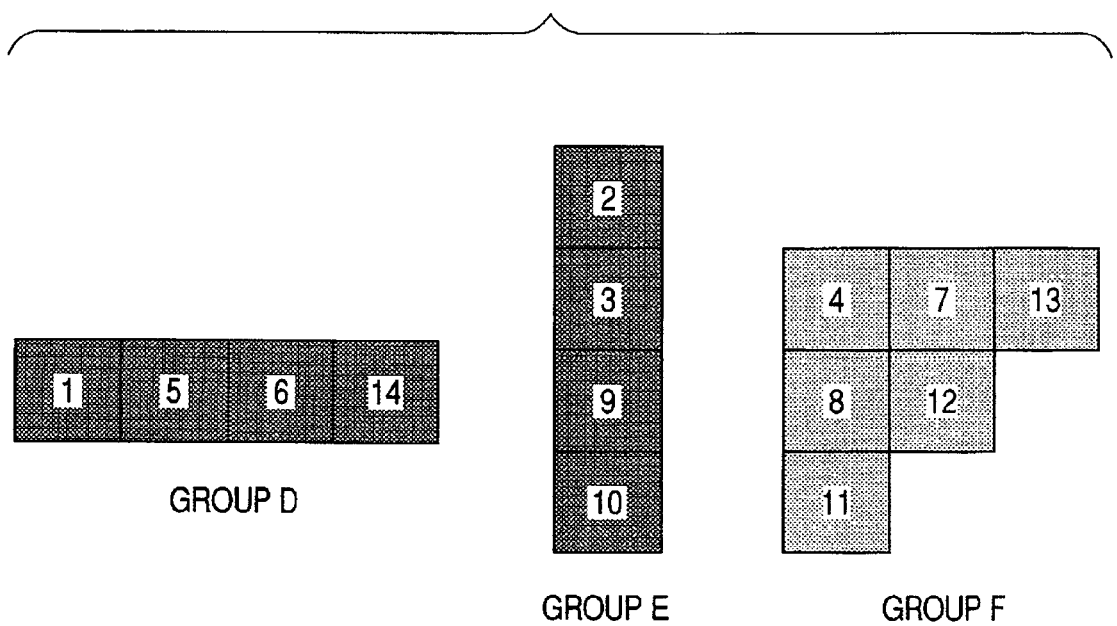
FIG. 4 is a drawing of describing an example of regrouping of the group A in FIG. 3 according to the present invention.

FIG. 4 shows a tripartite state in order to discriminate orientation of spatial frequency of the group A. The group D consists of data "1", "5", "6" and "14" of the AC components. The group E consists of data "2", "13", "9" and "10" of the AC components. The group F consists of data "4", "7", "8""11", "12" and "13" of the AC components.

Since orientation of the blurred images is apt to remarkably appear on the comparatively low spatial frequency components, orientation in the above described three groups will be discriminated. In Step S2406, the average value per data is calculated from the total sum of candidate block in each group D, E and F within each candidate block.

In Step S2407, the block having the maximum value of the calculated average values per data of each group D, E, and F in each candidate block, which is less than the preset threshold value 5, is excluded from the candidate block and the blocks to set to be excluded from the candidate block are set as "white". And the process moves to the process 4 shown in the flow chart in FIG. 25.

Figure 25:
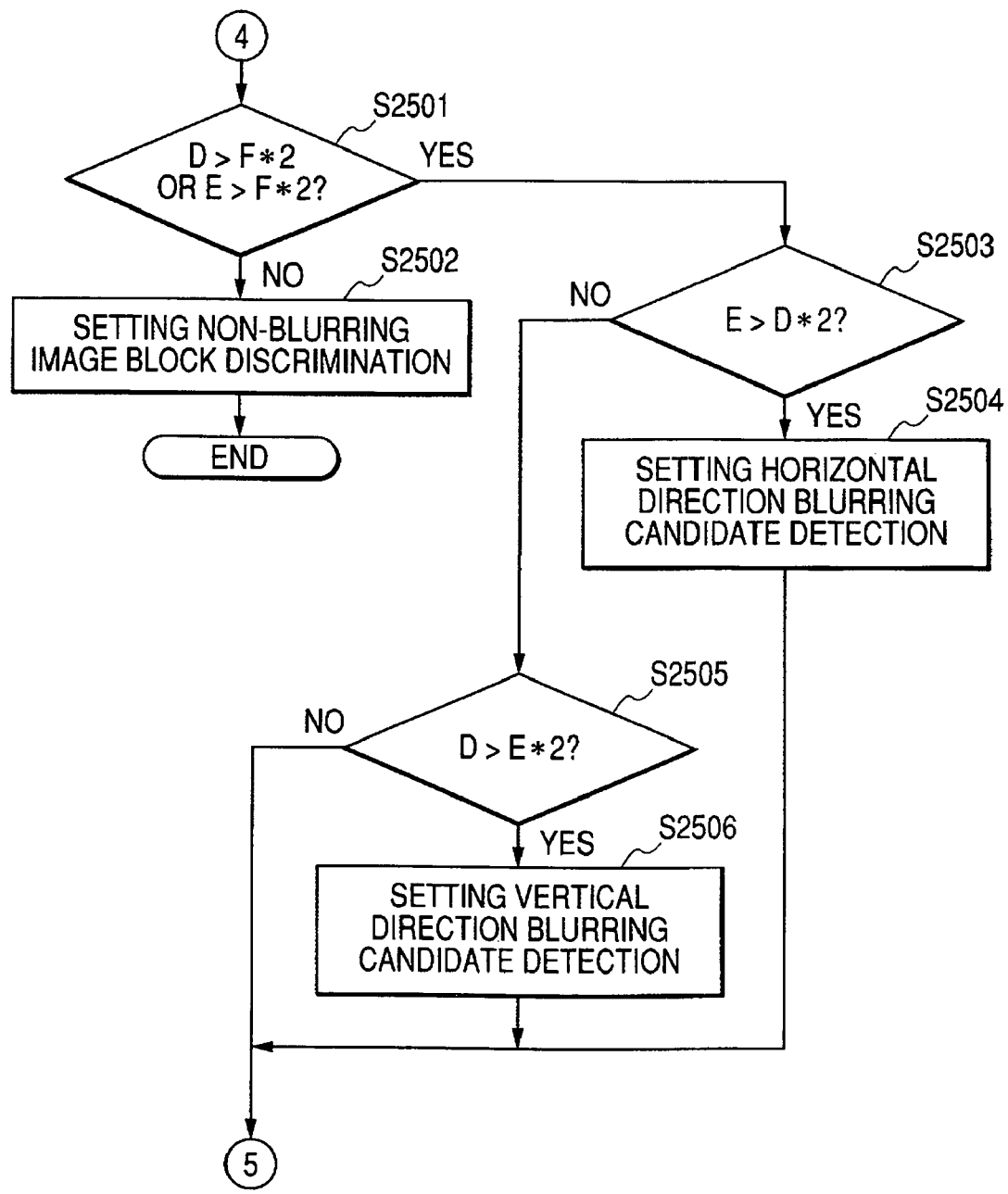
FIG. 25 is a flow chart of showing blurring discrimination processing according to the present invention.

In Step S2501 in FIG. 25, it is discriminated whether or the following logical formula 2 is satisfied. Here, reference characters D, E and F denote total sum of AC components included in respective groups D, E and F.

$$D > F \times 2$$

or $$E > F \times 2 \quad \text{(Equation 2)}$$

The Equation 2 is for discriminating whether or not an 8×8 pixel block has a characteristic on orientation endemic to blurring by taking into consideration the ratio of the information value showing orientation in low band spatial frequency component area to the other information values.

In the case where the condition of the above described Equation 2 is not satisfied, in Step S2502, discrimination of "non-blurring image block" is set for the discriminated 8×8 pixel block and the process is terminated. In addition, the process 4 shown in FIG. 25 is executed until the other candidate 8×8 pixel blocks are no longer present.

In Step S2501, for each 8×8 pixel block that has been discriminated to satisfy the above described condition, discrimination on orientation will be implemented thereafter.

That is, in Step S2503, on each 8×8 pixel block, it is discriminated whether or not there is a horizontal direction blurring feature amount. The discriminating equation will be the following Equation 3.

$$E > D \times 2 \quad \text{(Equation 3)}$$

Each 8×8 pixel block satisfying the condition of Equation 3 is discriminated to have horizontal direction blurring feature amount, and in Step S2504, setting is made that a horizontal direction blurring candidate has been detected.

For those that do not satisfy the condition of Equation 3, the step goes forward to Step S2505, and it is discriminated whether or not there is a vertical direction blurring feature amount. The discriminating equation will be the following Equation 4.

$$E > D \times 2 \quad \text{(Equation 4)}$$

Each 8×8 pixel block satisfying the condition of Equation 4 is discriminated to have a vertical direction blurring feature amount, and in Step S2506, setting is made that a vertical direction blurring candidate has been detected. In the case where the condition of Equation 4 is not satisfied, the step goes forward to the process 5 shown in FIG. 26.

Figure 26:
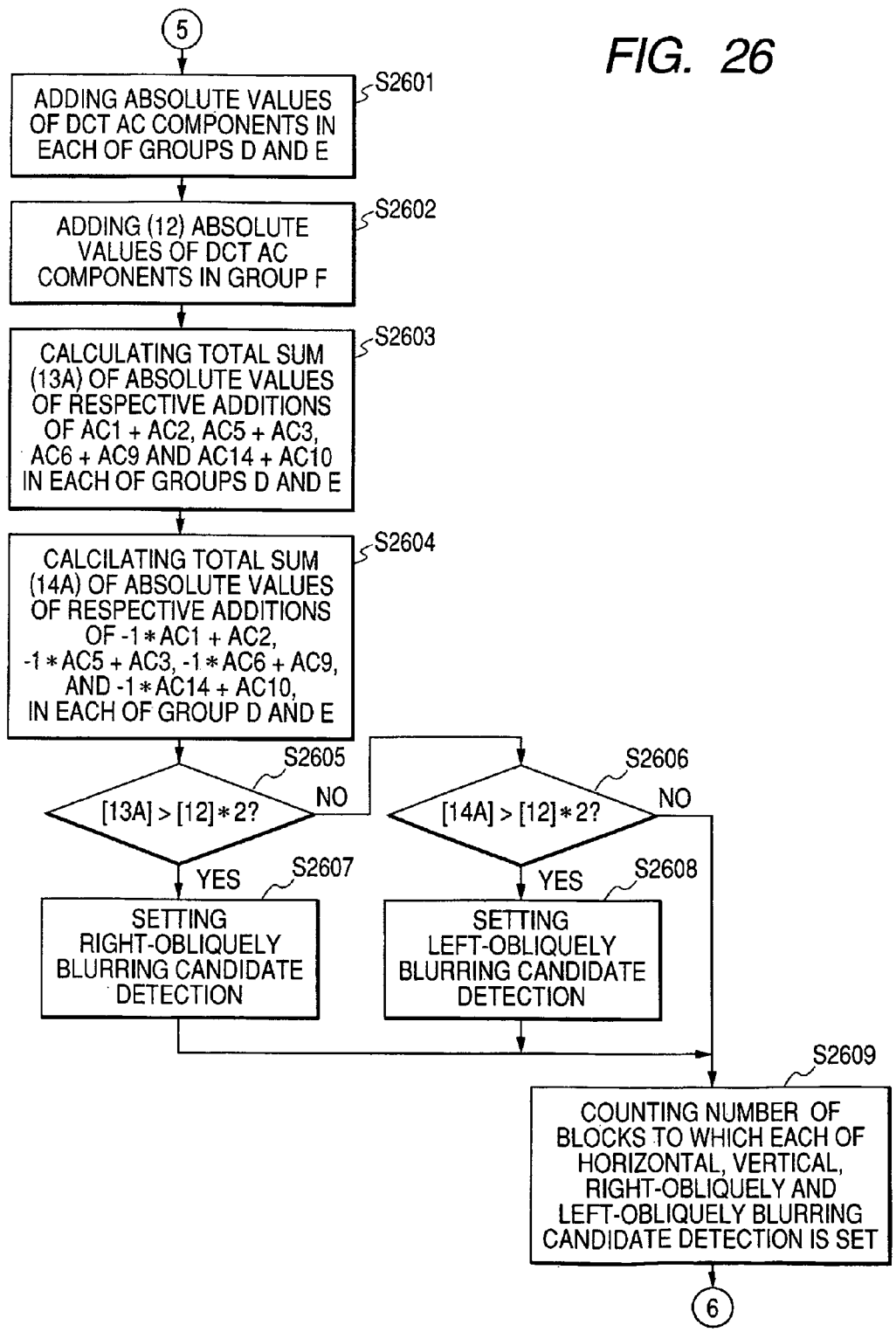
FIG. 26 is a flow chart of showing blurring discrimination processing according to the present invention.

In the process 5 shown in the flow chart in FIG. 26, on the 8×8 pixel blocks where no vertical direction and horizontal direction blurring feature amounts have been detected, it is discriminated whether or not there are obliquely blurring feature amounts. In Step S2601, in each 8×8 pixel block, after each value of AC component by DCT of each luminance component in the group D and the group E has been converted into an absolute value, additions of the values are implemented within each of the group D and the group E.

In Step S2602, in each 8×8 pixel block, after each value of AC component by DCT of each luminance component in the group F has been converted into an absolute value, addition of the values is implemented within the group F. The result of the addition will be denoted as [12].

In Step S2603, in each 8×8 pixel block to become candidates, a process in the following Equation 5 is implemented on the values of AC components by DCT. The AC components could be negative values, and deriving total sum of respective items subjected to conversion to absolute values after additions of respective relative values, and thereby the feature amount [13A] is calculated.

|AC component "1"+AC component "2"|→ (5a)

|AC component "5"+AC component "3"|→ (5b)

|AC component "6"+AC component "9"|→ (5c)

|AC component "14"+AC component "10"|→ (5d)

(5a)+(5b)+(5c)+(5d)=[13A]   (Equation 5)

In Step S2604, in each 8×8 pixel block, a process in the following Equation 6 is implemented on the values of AC components by DCT. The AC components could be negative values, and the two values are added after one of the relative respective values is multiplied by minus 1. Afterwards, summing the total respective items that have undergone absolute value value-conversion, the feature amount [14a] is calculated.

|−1×AC component "1"+AC component "2"|   (6a)

|−1×AC component "5"+AC component "3"|   (6b)

|−1×AC component "6"+AC component "9"|   (6c)

|−1×AC component "14"+AC component "10"|   (6d)

(6a)+(6b)+(6c)+(6d)=[14A]   (Equation 6)

Step S2605 implements a process of the following Equation 7 in order to discriminate whether or not each 8×8 pixel block has a feature of a right-obliquely blurring candidate.

[13A]>[12]×2   (Equation 7)

Each 8×8 pixel block satisfying the condition of Equation 7 is discriminated to have right-oblique direction blurring feature amount, and in Step S2607, setting is made that a right-oblique direction blurring candidate has been detected. For those that do not satisfy the condition of Equation 7, the step goes forward to Step S2606.

Step S2606 implements a process of the following Equation 8 in order to discriminate whether or not each 8×8 pixel block has a feature of a left-obliquely blurring candidate.

[14A]>[12]×2   Equation 8)

Each 8×8 pixel block satisfying the condition of Equation 8 is discriminated to have left-oblique direction blurring feature amount, and in Step S2608, setting is made that a left-oblique direction blurring candidate has been detected. Including those that do not satisfy the condition of Equation 8, the step goes forward to Step S2609. In Step S2609, discrimination on each 8×8 pixel block to be a blurring candidate in all the above described direction are added up. That is, numbers of 8×8 pixel blocks set as horizontal, vertical, right-oblique and left-oblique blurring candidates are respectively counted. After completion, the step goes forward to a process 6 shown in the flow chart in FIG. 27.

Figure 27:
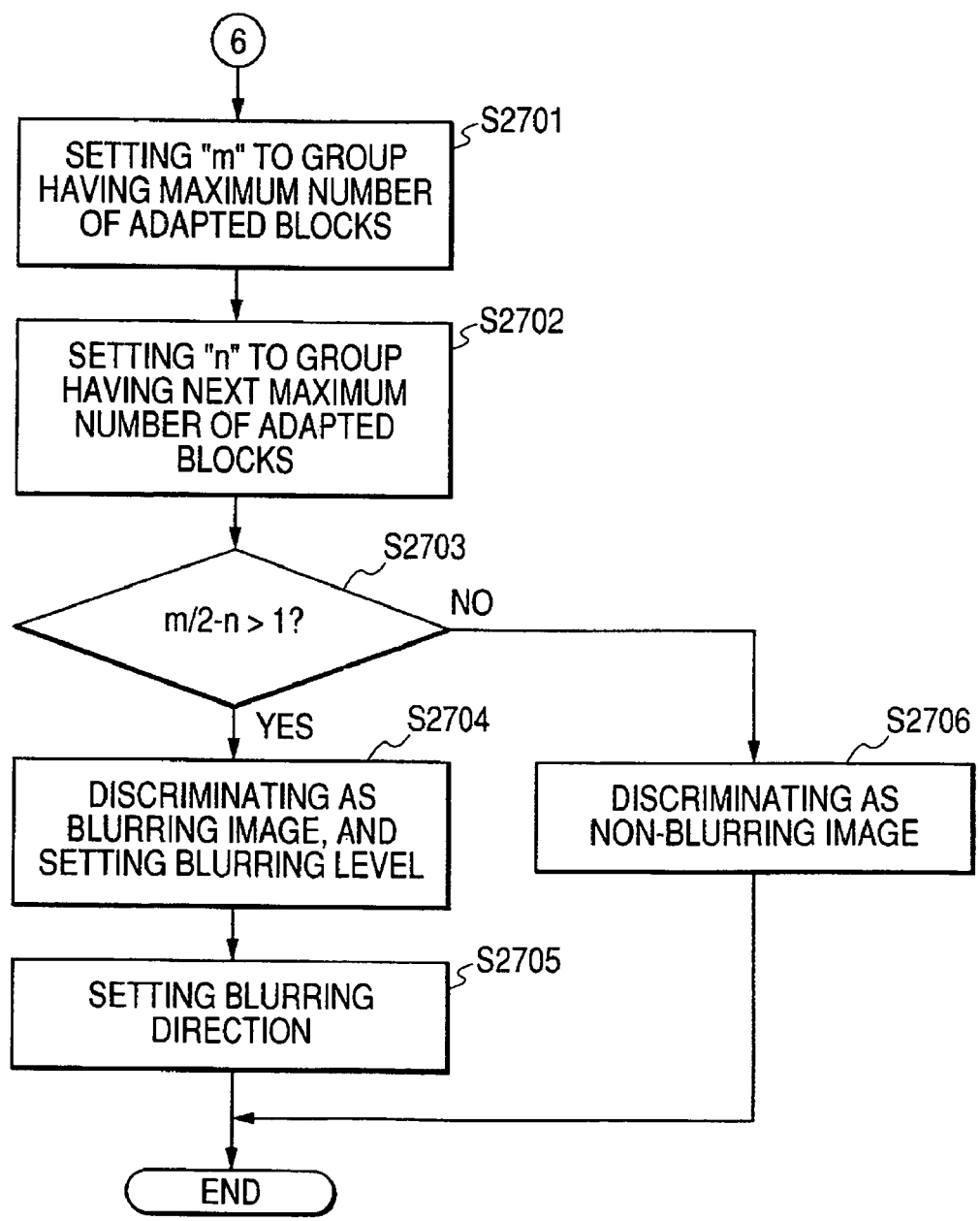
FIG. 27 is a flow chart of showing blurring discrimination processing according to the present invention.

In the process 6 shown in FIG. 27, presence or absence of blurring of the entirety of the subject image and its directions are discriminated from the 8×8 pixel block detected as blurring candidate for any direction. In Step S2701, among blocks detected as horizontal, vertical, right-oblique and left-oblique candidates, the total number of the maximum blocks of the candidate group having number of blocks is set as "m". In Step S2702, among horizontal, vertical, right-oblique and left-oblique blocks, the number of blocks of the candidate group having second maximum number of blocks is set as "n".

In Step S2703, discrimination processing of the following Equation 9 is implemented.

$m/2-n>1$   (Equation 9)

For the image that does not satisfy the condition of Equation 9, the step goes forward to Step S2706, to discriminate the image to be non-blurring image. For the image that satisfies the condition of Equation 9, the step goes forward to Step S2704, to discriminate the image to be blurring image. In addition, the value of "m/2−n" is set as blurring level. The larger the value becomes, the more intensively the image has possibility of a blurring image.

In Step S2705, the blurring direction detected in the maximum number (m) of candidate blocks is set and the processing is terminated.

With the flow of processing as described above, the blurring state of image data is discriminated. And, as the image data appears to be more intensive in blurring state, the value of levels are determined and set so that the data is not carried on the electronic album or is inserted into a region of small area of the electronic album. The control unit 55 associates the respective image data with the level of discriminated blurring state to manage them with the RAM or the hard disk. In the present embodiment, the blurring state higher than a certain threshold value is set to "1", the one lower than that is set to "2" and the one not in a blurring state is set to "3".

Moreover, a sample to which that process has been applied will be described.

Figure 6:
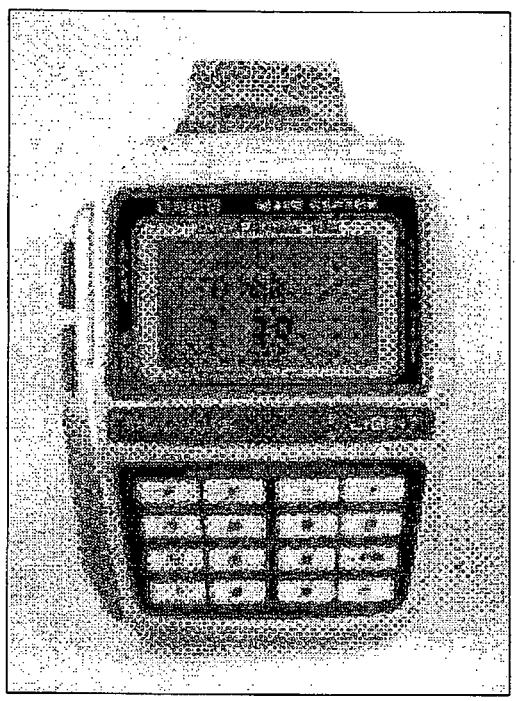
FIG. 6 is a drawing of exemplifying blurring-less image (sample 1) according to the present invention.

FIG. 6 is an image sample 1 and photographing of the image has been implemented well with not blurring having occurred.

Figure 8:
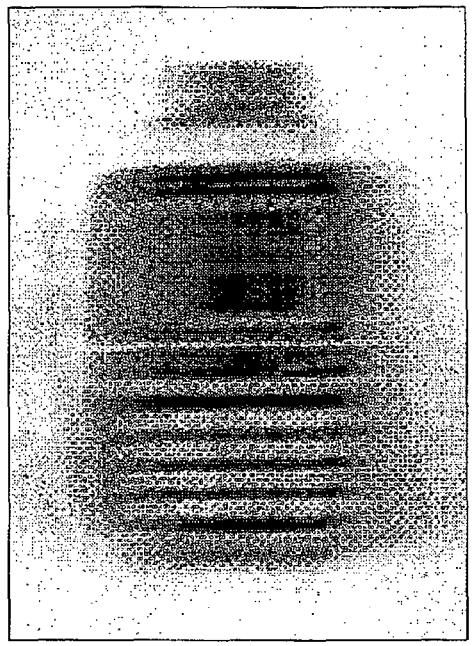
FIG. 8 is a drawing of exemplifying an image (sample 2) where horizontal direction blurring according to the present invention is present.

FIG. 8 is an image sample 2, which is a photograph of the same object as in FIG. 6 and has been photographed in a state with horizontal direction blurring having occurred at the time of photographing.

Figure 10:
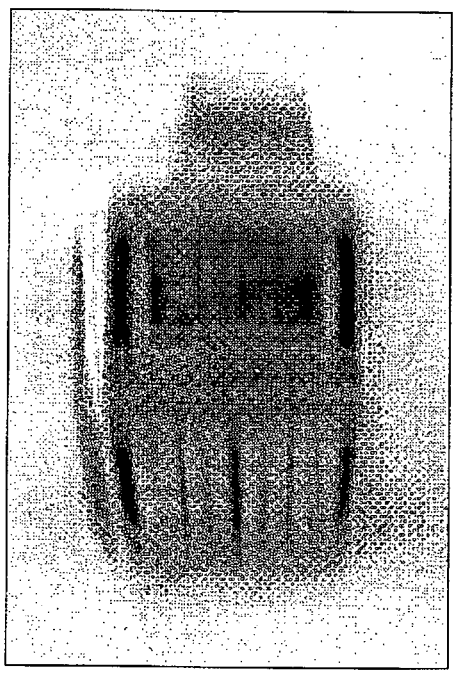
FIG. 10 is a drawing of exemplifying an image (sample 3) where vertical direction blurring according to the present invention is present.

FIG. 10 is an image sample 3, which is a photograph of the same object as in FIG. 6 and has been photographed in a state with vertical direction blurring having occurred at the time of photographing.

A result of implementing the above described detection processing for blurring discrimination onto the above described three sample images will be described as follows.

FIG. 29 shows data detected from the image sample 1.

In the table of "number of data and average value", a group of 8×8 pixel blocks configuring an image is expressed as a data unit and the corresponding column is "number". In addition, the amounts filled in the columns of groups A to F are average numbers in groups classified into vertical (red), horizontal (green), right-obliquely (blue), left-obliquely (orange), (black), (gray) and (white) that are classified into vertically arranged lines.

The second table of "ratio for population of each read, green, blue and orange" shows the ratio of blocks of each direction to blurring candidate blocks of vertical (red), horizontal (green), right-obliquely (blue) and left-obliquely (orange) (totaling 3076 blocks).

The third tabled of "ratio for population of each of read, green, blue, orange, white and gray" shows the ratio of blocks of lack candidate group to the population including gray and white blocks discriminated to be non-adapted to the population in addition to the above described second table data.

As displayed in the second table, the image sample 1 can be confirmed to be in a state of lacking substantial bias among the blocks detected as blurring candidate blocks. In addition, it is apparent that the percentage of the oblique direction blurring candidate blocks is extremely low compared with vertical direction or horizontal direction candidate blocks since the percentage of vertical and horizontal candidate blocks is 42% for vertical and is 53% for horizontal.

Figure 7:
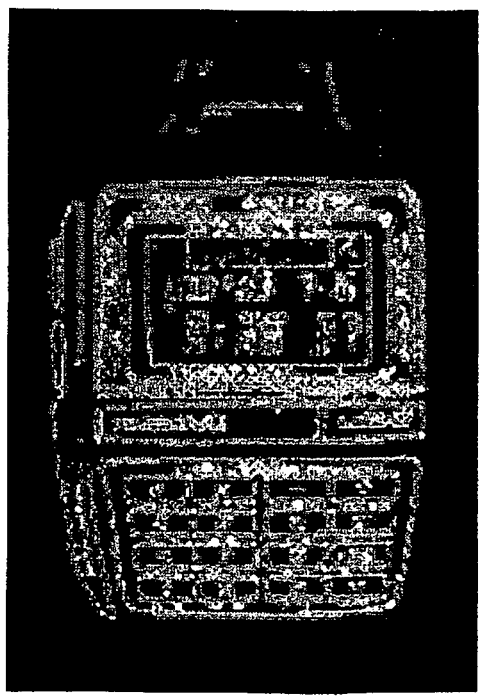
FIG. 7 is a drawing of showing distribution of blurring candidate blocks detected by applying blurring discrimination processing according to the present invention to the image in FIG. 6.

This clarifies tendency of abundance in vertical and horizontal direction information. The image sample 1 having undergone color coding in accordance with detected classification blocks on the basis of the above described detected data is shown in FIG. 7. Taking into consideration the result, no particular direction block is abundant in percentage, and no occurrence of blurring can be confirmed.

FIG. 30 is data detected from the image sample 1. The data configuration is the same as in the above described FIG. 29. The image sample 2 can be confirmed to be in a state of occurrence of substantial bias toward the horizontal direction since the percentage of vertical and horizontal candidate blocks in blurring candidate blocks is 0% for vertical and is 100% for horizontal.

Figure 9:
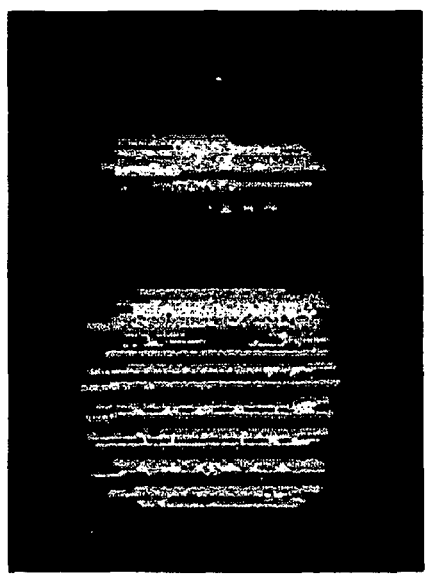
FIG. 9 is a drawing of showing distribution of blurring candidate blocks detected by applying blurring discrimination processing according to the present invention to the image in FIG. 8.

This result clarifies tendency of overwhelming abundance in horizontal direction information. And from that tendency, it can be discriminated that an image has horizontal direction blurring. The image sample 2 having undergone color coding in accordance with detected classification blocks on the basis of the above described detected data is shown in FIG. 9. Taking into consideration the result that the percentage of horizontal direction block (green) is abundant, occurrence of blurring can be confirmed.

FIG. 31 is data detected from the image sample 3. The data configuration is the same as in the above described FIG. 29. The image sample 3 can be confirmed to be in a state of occurrence of substantial bias toward the vertical direction since the percentage of vertical and horizontal candidate blocks is 99% for vertical and is 1% for horizontal.

Figure 12:
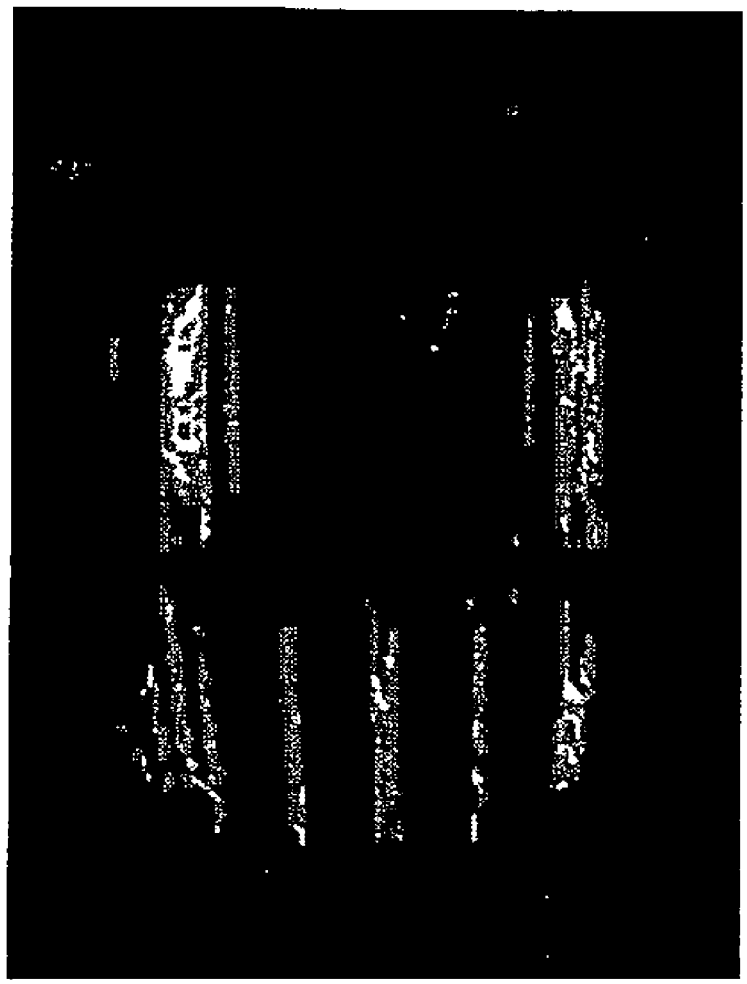
FIG. 12 is a drawing of showing distribution of blurring candidate blocks detected by applying blurring discrimination processing in accordance with the present invention to the image in FIG. 10.

This result clarifies tendency of overwhelming abundance in vertical direction information. And from that tendency, it can be discriminated that an image has vertical direction blurring. The image sample 3 having undergone color coding in accordance with detected classification blocks on the basis of the above described detected data is shown in FIG. 12. Taking into consideration the result that the percentage of vertical direction block (red) is abundant, occurrence of blurring can be confirmed.

Here, the method of classifying spatial frequency components is not limited to the method described herein, but the other methods may be employed for classification.

Image Quality Discrimination Processing

Now back to FIG. 1, in Step S105, image quality discrimination is implemented onto outputs to the electronic album on the basis of types of input apparatuses having photographed image data, amount of compressed data, pixel amount at the time of insertion to template data and types of images for image quality requesting, etc.

Figure 39:
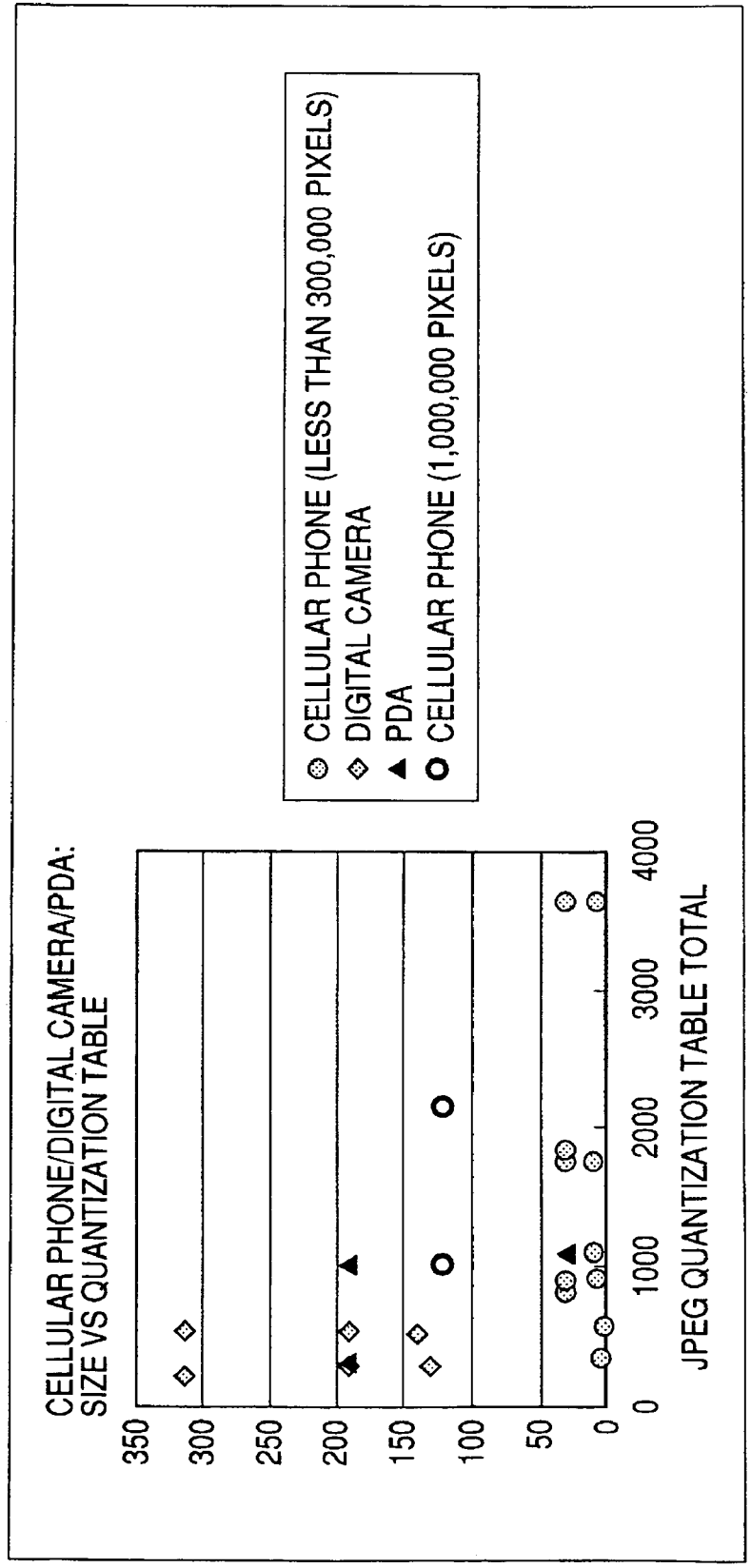
FIG. 39 is a graph of showing correlation between image size according to the present invention and quantization table of image files.

At first, relation between image size and quantization table is shown in FIG. 39. In FIG. 39, the vertical axis shows input image sizes and the horizontal axis shows total sums of quantization indicating values of quantization table applied to AC components 1 to 63 after DCT of the 8×8 pixel blocks.

In FIG. 39, a digital camera having 1.3 million to 3 million pixels is shown as an example of the input apparatuses, and a cellular phone (with less than 30 pixels and with 100 pixels) as well as a PDA (with 2 million pixels) are shown as apparatuses with a function of a camera, respectively.

As shown in the drawing, it can be seen that, for the digital camera having a lot of pixels, the quantization table of less total quantization indication value is used, and in case of a cellular phone with less pixel number, the quantization table of larger quantization indication value with large data compression amount is used. In addition, the PDA having intermediate number of pixels shows compression ratio between the digital camera and the cellular phone also as to the quantization table.

This relation takes place since specifications required for apparatuses are different from processing capacity of incorporated apparatuses according to each of apparatuses. Therefore, specifying an input apparatus enables prediction of image quality of the input image to a certain extent.

As a method of specifying the input apparatuses, the most potential one is use of attached information that is occasionally included in image data. Analysis of the attached information leads to specification of the input apparatuses.

Subsequently, data compression amount of input images, output resolution and image quality according to correlation of input-output sizes will be described. FIG. 40 shows image quality level used for image quality discrimination and a threshold value tables for discrimination. At first, as a basic system, image quality discrimination table according to relation between output resolution and quantization table values to be used in data compression is shown in FIG. 40A. The items vertically filled in are for output resolution and classified into three stages of "not less than 135 dpi", "from less than 135 dpi to not less than 70 dpi" and "less than 70 dpi" in the present embodiment.

The items horizontally filled in are size of quantization tables, the parenthesized figures are concepts used also in FIG. 39, indicating the total sum of quantization indication values from 1 to 63 in the table in the quantization tables. Therefore, as the value gets smaller, the data compression amount will be less.

In case of output resolution being not less than 135 dpi and the quantization table to be used being "T9" (total sum of quantization indication values being 541), image quality is determined to be high definition. In addition, as shown in FIG. 40A, there are cases capable of securing image quality around the middle level, that is, a case with output resolution being less than 135 dpi and not less than 70 dpi and the quantization table being "T9" and a case with output resolution being not less than 135 dpi and the quantization table being "T6", and any of the other combinations is determined to be of image quality of low quality.

Here, the image quality around the middle level refers to such a level that is not discriminated as high quality in the image where human faces being on since, in case of a subject that is possible to catch attention as a subject as human observation requirements, for example, human face etc. being present, high image quality is apt to be desired, but is discriminated to be high quality in case of a landscape etc. Here, it is possible to detect using a variety of types of known technologies such as template matching whether or not a human face is present in an image.

In FIG. 40B, a table of fixing output resolution from relation between the size of output media (stock paper etc.) and the size of input image at the time of output format being printing.

The items vertically filled in are for input image size and, in the present embodiment, the case where there are three types of VGA (640×480), SXGA (1024×960) and UXGA (1600×1200) is shown. The items horizontally filled in are output media sizes, and there a case where there are two types of "A4" and "L size" is shown. From both of those combinations, output resolution is fixed. There, required resolution is derived from the size of printing area of the output media and the number of pixels in the input image. Here, the combination of UXGA and L size, that gives rise to resolution exceeding 300 dpi, is regarded as impossible mixture in the present embodiment.

In FIG. 40C, a table for determining image quality from input image size and quantization tables in case of unknown output size is shown.

Figure 41:
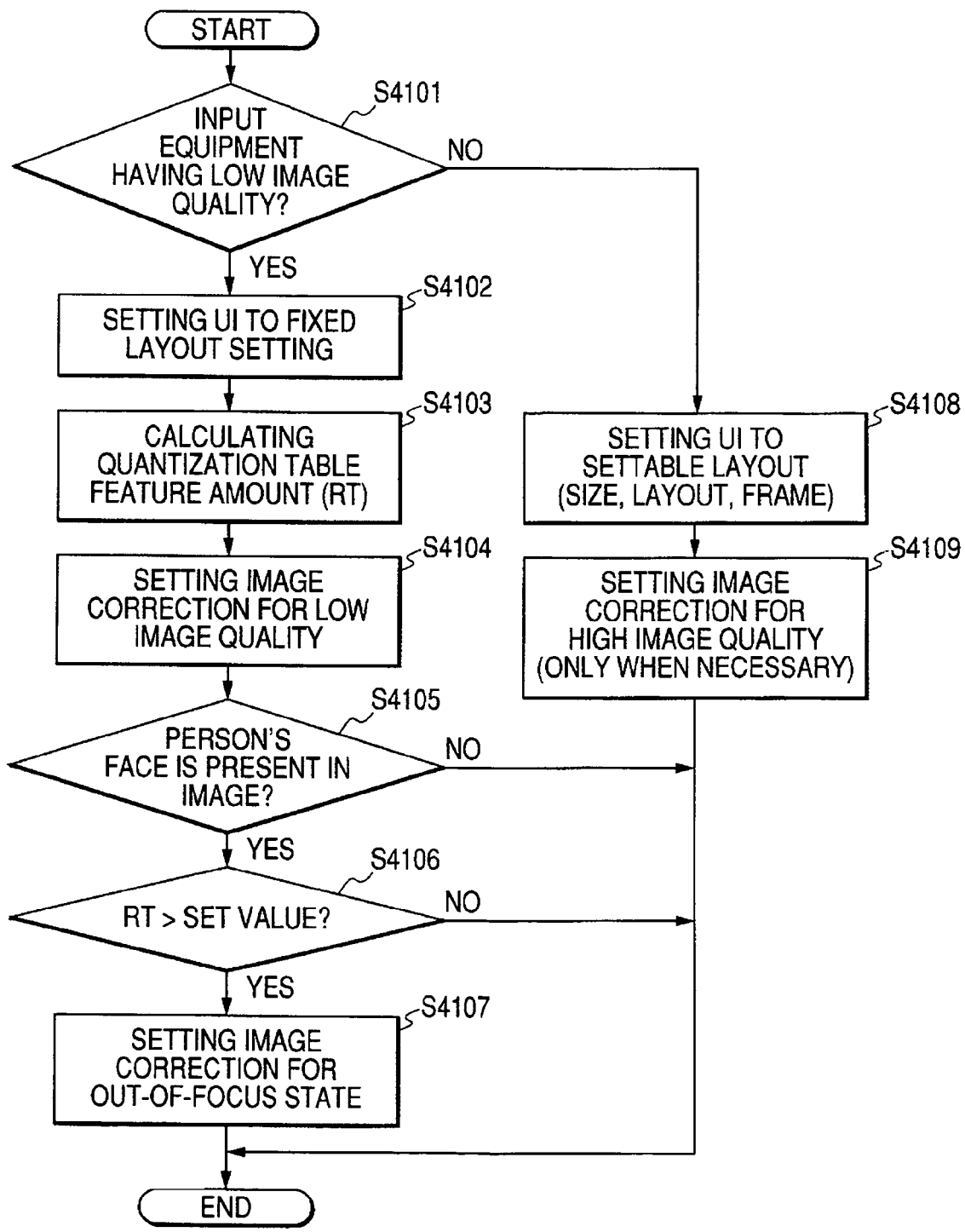
FIG. 41 is a flow chart of describing a process of determining presence or absence of correction and correction contents corresponding with image quality according to the present invention.

FIG. 41 is a flow chart of describing processing of implementing album layout as well as image correction from image quality discriminated with tables in FIGS. 40a to 40C. In Step S4101, attached information in an input image is analyzed and in the case where the input apparatus of the photographed image is discriminated as an apparatus with low image quality (for example a cellular phone with 0.3 million pixels), the step goes forward to Step S4102. In the other cases, the step goes forward to Step S4108.

In Step S4108, with tables shown in FIGS. 40A to 40C, image quality is discriminated to set insertion of image data in processing for carring the image on the electronic album in a subsequent stage and levels of degree of freedom related to sizes of insertion area. Here, the degree of freedom on changes in sizes, layout and frame is set. For such image data that provide with image quality as high as possible, a high level is set so as to allow to be disposed in a region of large area and in the center on an electronic album. The control unit 55 associates the respective image data with the set image quality level to manage them with the RAM or the hard disk. In Step S4109, image correction indication amount is set in accordance with necessity.

In Step S4102, since an image is determined to be a low definition image in the prior stage, therefore such a level is set that provides no degree of freedom on changes in disposition in the layout processing in a subsequent stage. And, only in case of fixing the layout in such a level that is still satisfactory with low image quality, entry is allowed. In the present embodiment, "1" as the level is given to such an image data with low image quality. "3" as the level is given to image data with high quality of not less than a certain threshold value, and "2" as the level is given to image data with image quality therebetween. In Step S4103, the total sum of quantization indication values to be applied to the AC components 1 to 63 in the quantization table is calculated and set as feature amounts of quantization table "RT"

In Step S4104, also as for image correction, a correction type such as high contrast and high chroma etc. that are suitable for low quality images is set. In Step S4105, it is detected whether or not a person's face is disposed in a subject image, and in the case where there are none, the step is terminated and in the case where there is any, the step goes forward to Step S4106.

In Step S4106, it is discriminated whether the precedingly calculated quantization table feature amount "RT" is higher than a value set in advance. As a result of discrimination, in case of "RT" being lower than the set value, the step is straightforwardly terminated, and in case of "RT" being higher than the set value, the step goes forward to Step S4107.

In case of reaching Step S4107, it can be assumed that a person's face is present in a low quality image, moreover highly compressed quantization has been implemented, and therefore so-called out-of-focus state appears, and therefore, as the image correction instructing contents, corrections such as unsharp mask and the designated amount of intensity thereof (application radius etc.) are determined and the step is determined.

Now back to FIG. 1, in Step S106, taking the above described setting items as basis, and under consideration of a level having been set in accordance with the similarity discrimination result, the blurring discrimination result and the image quality discrimination result, image data to be carried on the electronic album are selected from among the whole image data of a subject folder. In case that any designation on pages of the album for a setting screen shown in FIG. 14 is present, at first, the above described discrimination excludes, from potential selections to be carried on the electronic album, image data in order from level which is set lower. Here, in the case where the number of selected images counts more than the designated number of images of image data, image size may be changed by way of layout adjustment.

In Step S107, image correction processing is executed on image data to be carried on an electronic album. As items of image correction, following corrections etc. are nominated as items.

1) White balance
2) Contrast
3) Exposure
4) Chroma
5) Sharpness (unsharp mask)

In accordance with correction contents and intensity corresponding to image quality discrimination described with the flow chart in FIG. 41, the contents of correction thereof change.

Processing to Run onto Electronic Album

In Step S108, considering levels of image data based on the above described discrimination and according to designations on setting items, image data are inserted into template data of an electronic album.

Figure 15:
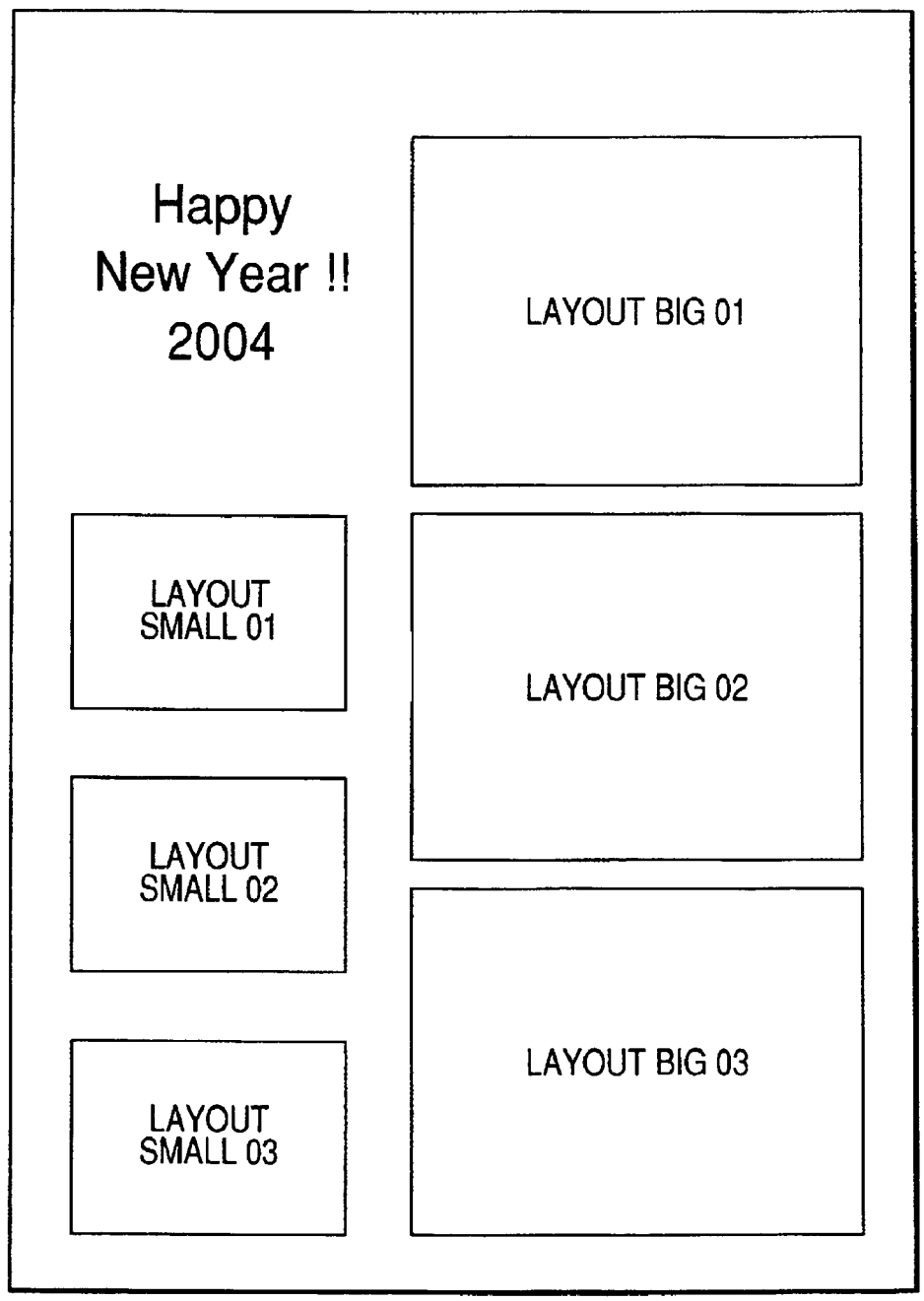
FIG. 15 is a drawing of exemplifying display of template data according to the present invention.

FIG. 15 is an example of a template data of an electronic album.

In this example, there are six pieces of images to undergo layout on a page, and there exist two types in size of insertion area for image data, that is, "large"and "small".

Figure 38:
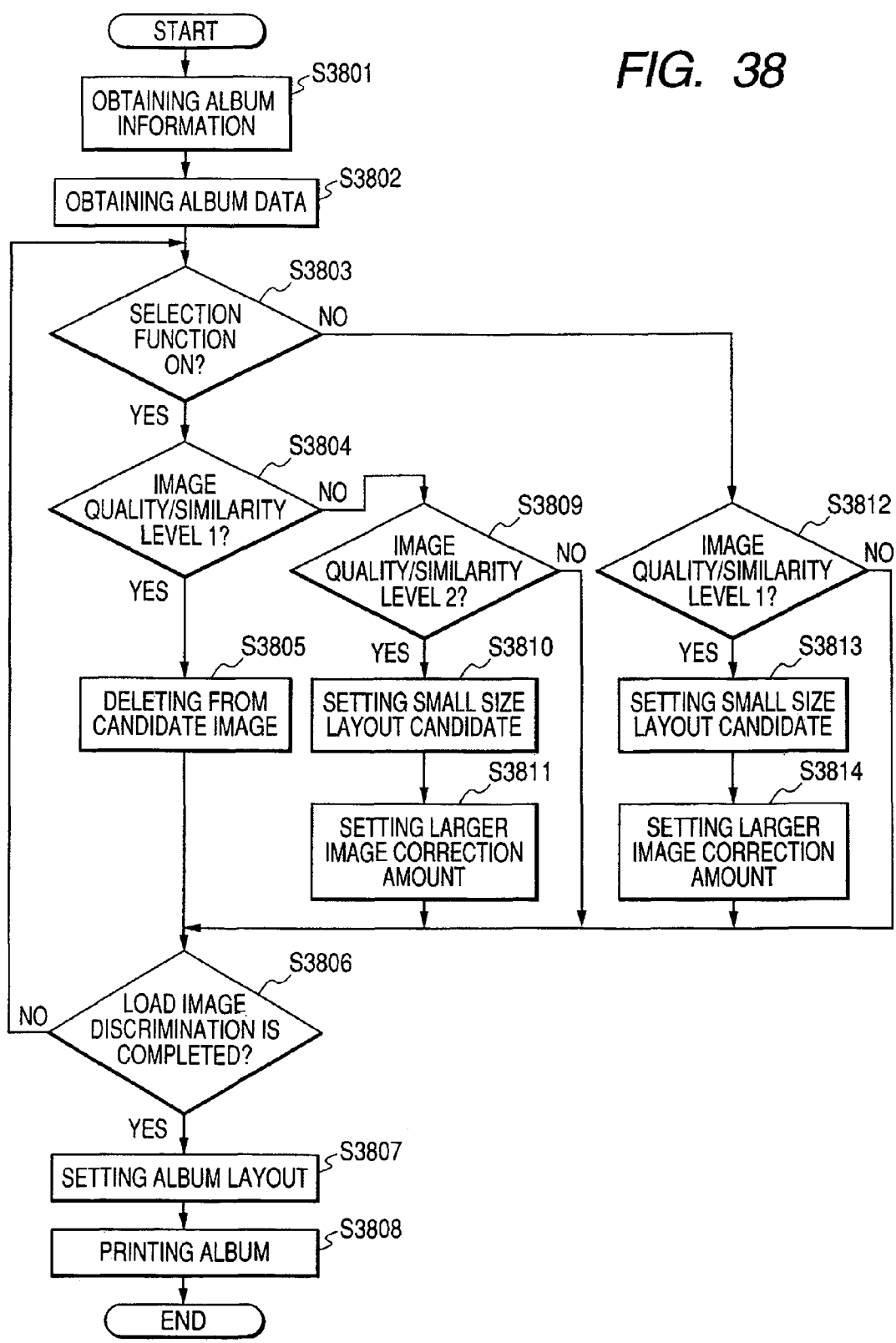
FIG. 38 is a flow chart of describing processing of inserting into template data the image data the present invention.

With reference to a flow chart shown in FIG. 38, processing of inserting, into template data, the image data on which respective discrimination is completed and which were selected to be carried on the electronic album will be described. In Step S3801, album-related information designated in the above described Step S101 and respective types of discrimination information thereafter is obtained.

In Step 83802, the control unit 55 reads image data to be carried the electronic album as album data from the hard disk. In Step 3803, in setting screen in FIG. 14, it is checked whether or not the selection function has been selected. In the case where the selection function has not been selected, the step goes forward to Step S3812, and in the case where the selection function has been selected, the step goes forward to Step 53804.

In Step S3812, it is discriminated whether or not the level "1" which defines low quality level and low meaningfulness of select has been given in any of similarity, blurring discrimination and image quality discrimination. In the case where the image data are not in the level "1", the step goes forward to Step S3806. In the case where the image data are in the level "1", the step goes forward to Step S3813 to set to an area flag that the data are the candidate image data to be inserted into a small size area. Here, the control unit 55 associates to the image data with the area flag to manage them with the RAM or the hard disk.

In Step S3814, image correction instruction onto the image data to which the level "1" has been given is implemented. Onto initially set image correction intensity, correction on "contrast" and "chroma" is set slightly more intensive. The step goes forward to Step S3806. In Step S3804, processing at the time when the automatic selection function of image data to be carried on an electronic album is selected is executed.

It is discriminated whether or not the data are image data to which the level "1" which low quality level and low meaningfulness of select has been given in similarity, blurring discrimination and image quality discrimination having undergone discrimination processing precedingly. In case of image data to which the level "1" has been given, the step goes forward to Step S3805 And, without being laid out onto an electronic album, the data are deleted from the candidate images. Thereafter the step goes forward to Step S3806. In addition, in case of not being a "Level 1" image, the step goes forward to Step S3809.

In Step S3809, it is discriminated whether or not the data are image data to which the level "2" which defines low quality level and low meaningfulness of selection has been given in similarity, blurring discrimination and image quality discrimination having undergone discrimination processing precedingly. In case of image data to which the level "2" has not been given, the step goes forward to Step S3806. In addition, in case of image data to which the level "2" has been given, the step goes forward to Step S3810.

In Step S3810, an area flag showing that the data are the candidate image data to be inserted into a small size area is set. Here, the control unit 55 associates to the image data with the area flag to manage them with the RAM or the hard disk. In Step S3811, the image correction instruction onto the image data to which the level "2" has been given is implemented. And, onto initially set image correction intensity, correction on "contrast" and "chroma" is set slightly more intensive. The step goes forward to Step S3806.

In Step S3806, it is determined whether or not discrimination on all the subject image data is completed. In the case where discrimination on all the image data has not been completed, discrimination will go on, while in case of completion, the step moves to Step S3807.

In Step S3807, based on the above described discrimination, the subject image data are inserted into the template data to make album data. Thereby, image data with lower image quality among similar image data, image data in a blurring state and image data discriminated to have low image quality will be inserted into a small area in the electronic album so as to be displayed, or will not be inserted into the electronic album so as not to be displayed.

In Step S3808, the data are registered to "printing album" in order to print the formed album data, to wait for a print command. In receipt of a print command, in Step S109, printing instruction is given to a printer connected externally.

The printer executes print processing based on the album data and an output result is derived.

In addition, according to the present embodiment, feature amounts are analyzed from image data having undergone compression and coding, and based on those feature amounts, image evaluation such as the blurring state and similarity is implemented. Therefore, it is not necessary to temporarily expand the compressed image data so that resources such as memory etc. required for processing can be made less. That is especially effective for incorporated apparatuses with few resources.

Second Embodiment

Subsequently, a second embodiment of the present invention will be described. Since the present embodiment is realizable with the same configuration as in the first embodiment, descriptions on a hardware configuration etc. will be omitted.

In the first embodiment, the whole area of subject image data underwent similarity and blurring discrimination processing with application of uniform weighting. However, all of the areas of subject images are not always given the same weighting on evaluation discrimination of image data. Therefore, the present embodiment intends to realize more realistic evaluation by differentiating application of weighting to an important area among image data onto which an observer focuses his attention from that of the other area.

Here, in the present embodiment, an important area is a person who is highly possible to be a main subject, and an image such as person's flesh and a person's face etc. undergoes extraction processing as a range of extraction area. For example, for a method of extracting area of person's flesh, technologies disclosed in Japanese Patent Application Laid-Open No. 2004-38480, Japanese Patent Application Laid-Open No. 2004-38481 and Japanese Patent Application Laid-Open No. 2004-38482 etc. can be applied. Otherwise, for discrimination of a face area, feature amount discrimination of utilizing vectors etc. is known.

Figure 13:
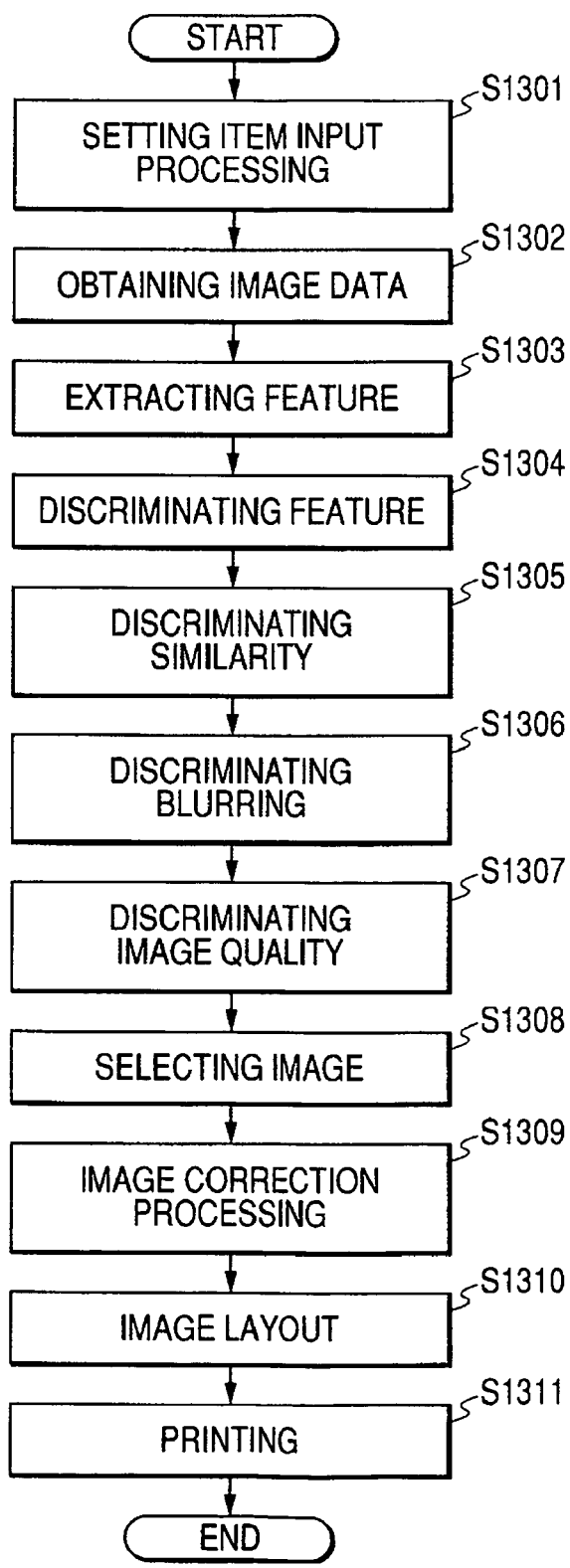
FIG. 13 is a flow chart of showing processing that a control unit of an image processing apparatus according to the present invention executes.

While process flow of an image processing apparatus related to the present embodiment is shown in the flow chart in FIG. 13. As apparent from comparison with FIG. 1, FIG. 13 is configured by addition of partial processing to the processing in FIG. 1, but since there are changes made on internal processing to be executed in steps having been described so far as well, such changes as well was the added portions will be described in accordance with necessity as well. In the processing in FIG. 13, too, as described in the preceding embodiment, an application (for example, album application) for implementing the processing to be described in the present embodiment is activated and is started operations at the point of time when a subject image has been designated with, for example, selection of a folder etc.

In Step S1301, an item-setting screen as shown in, for example, FIG. 14 is displayed to urge a user to make instructions on process setting of an inputted image. At this time, in feature extraction to be described later, a face being a feature amount of a particular person is registered and is arranged to be given the higher priority to arrangement size in a layout of the image where the person appears, and to choice of the image.

In Step S1302, as described in the prior embodiment, image data in an input image group designated by the user are obtained from devices such as a memory card drive 56 for reading out image data stored in a memory card and a hard disk 57 having already stored photographed image data etc.

In the case where there are any obtained image data that cannot be read in due to memory capacity of a RAM etc.

included in the control unit 55, at least information, such as the number of images, required for editing work and image data of lowest necessity but being indispensable are read in.

As information being necessary for editing, firstly, information described as Exif data in compressed image data that are generally utilized as photographed image file is considered.

In Step S1303, search processing is implemented to confirm whether or not a feature area defined in advance is present in the whole area of a subject image. As concerns particular methods, which have already been described though, person's flesh regions and person's facial regions are extracted as subjects. In case of the subject area being a face region, it is also possible to apply weigh onto a person of importance, registered in advance to implement processing.

In Step S1304, as a result of extraction processing, it is discriminated whether or not a person within a feature region set in advance is found successfully. In case of successful extraction of a region deemed to be of the person, the detected content is registered and a value of indicating the successful extraction is set in order to make weighted processing executable on the currently-detected region, in the subsequent processing.

Figure 37:
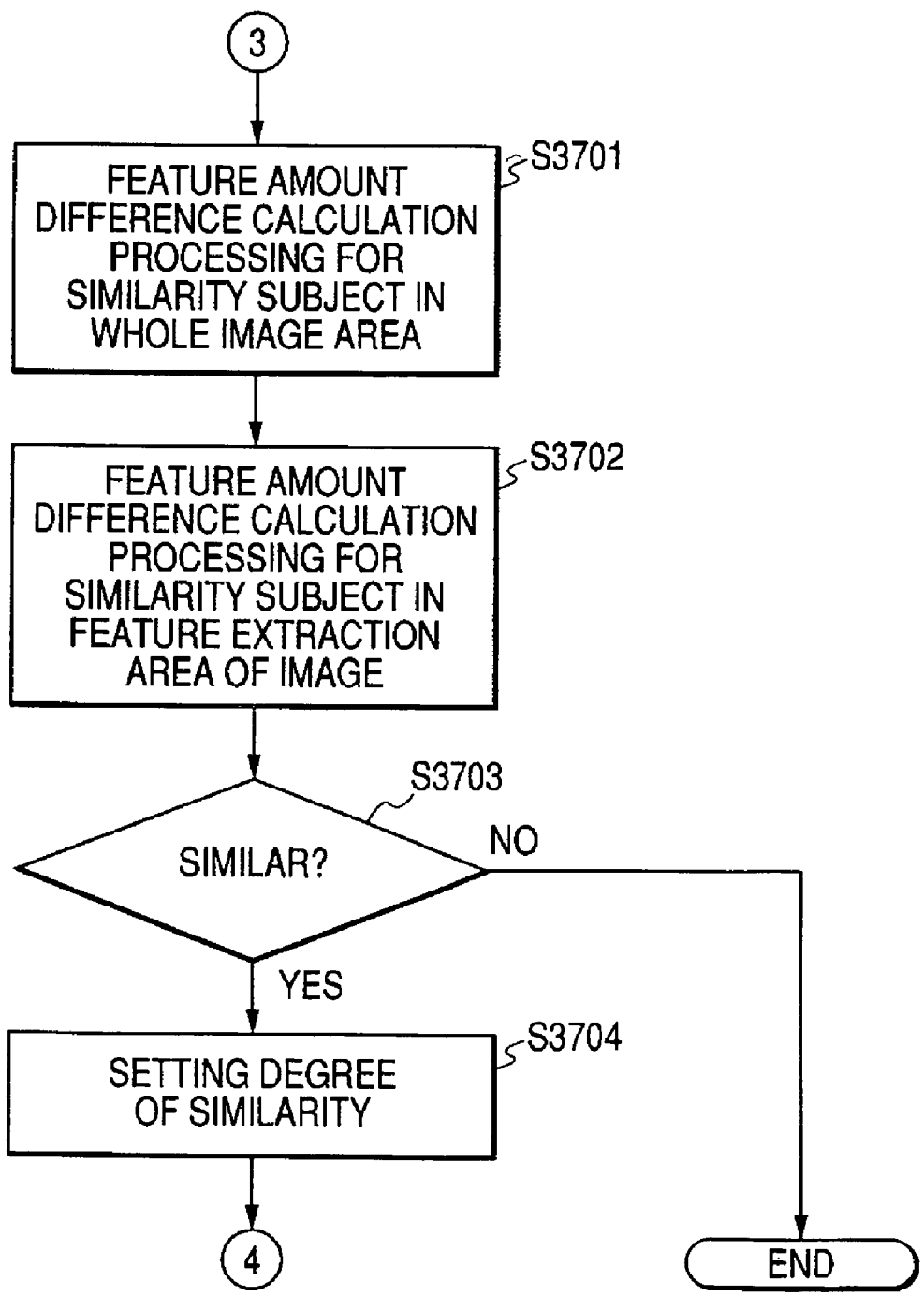
FIG. 37 is a flow chart of describing similar image discrimination processing according to the present invention.

In Step S1305, a similarity discriminating process is implemented. In the preceding embodiment, the similarity discriminating process was described with reference to FIG. 22 and FIG. 33 to FIG. 36, however, in the present embodiment, the process corresponding to the process 3 shown in FIG. 34 can be realized by being converted into a process to be described with a flow chart shown in FIG. 37. Accordingly, here, only a process shown in a flow chart in FIG. 37 will be described.

In Step S3701, a process matching the process in the above described Step S3401 is executed. That is, feature amount difference calculation processing that has been described with reference to FIG. 5 is implemented.

In Step S3702, a process result of Step S1304, that is, a discrimination result on whether or not the person area has been extracted from the subject image area is obtained, and in case of having obtained a result of successful obtainment, it is confirmed at first whether or not discrimination that a personal area is present in a comparison subject image has been set, and in case of discriminating presence on a personal area being invalid, it is set that two images are not similar images.

In addition, in the comparison subject image, in case of discrimination on presence of a personal area being valid, feature amount comparison with spatial frequency feature in Step S3401 is executed in the limited area extracted as a personal area. The result is set as similarity corresponding with the calculated value thereof.

In Step S3703, similarity discrimination is implemented on the basis of degrees of similarity. The image from which a person's area is extracted, undergoes discrimination based on logical addition of similarity in the whole image and similarity of the person's area which is a feature extraction area. That is, in the case where similarity is high in at least one of the whole area or the feature area, determination for a similar image is derived. In that case, it is possible to take logical addition by applying weighting onto the feature area as well.

In the case where no similar image is discriminated, the similarity discrimination processing is terminated and the step goes forward to the subsequent Step S104. In case of similarity having been discriminated, the step goes forward to Step S3704.

In Step S3704, the degree of similarity determined in Step S3701 is set, and the step goes forward to the process 4 shown in the flow chart in FIG. 35.

Since the subsequent processing is likewise the precedent embodiment, description thereof will be omitted.

In Step S1306, blurring discrimination processing is implemented. Details of blurring discrimination processing (Step S104 in FIG. 1) have been described with the flow charts in FIG. 23 to FIG. 27 in the preceding embodiment, but in the present embodiment, contents of blurring discrimination processing are modified by presence or absence of extraction of a feature area.

Figure 28:
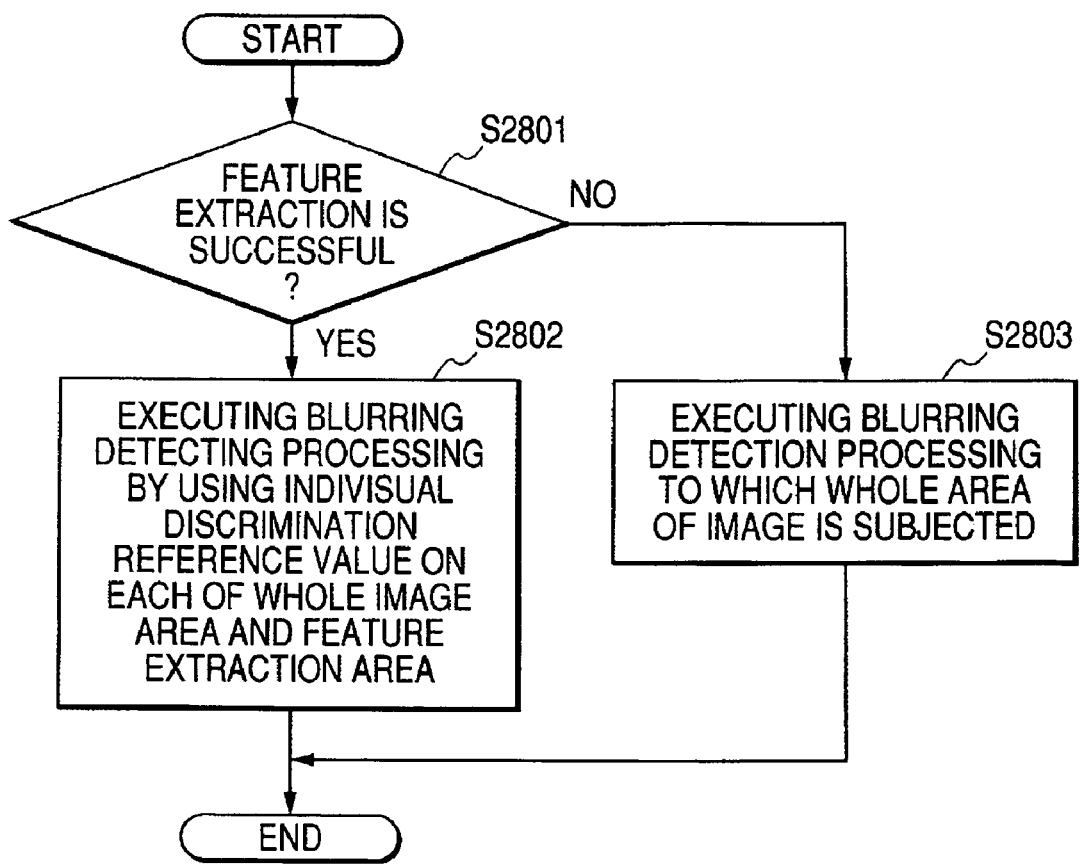
FIG. 28 is a flow chart of showing blurring discrimination processing according to the present invention.

With a flow chart in FIG. 28, blurring discrimination processing in the present embodiment will be described. In Step S2801, a result discriminated in Step S1304 is obtained so that processing branches according to success or failure of extraction of a feature area.

In case of failure in extraction of a person's area that is a feature area, the step goes forward to Step S2803 so that blurring discrimination processing described as Step S104 in the preceding embodiment is executed.

On the other hand, in case of success in extraction of a person's area that is a feature area, the step goes forward to Step S2802.

In Step S2802, by using individual discrimination reference values to be applied to the whole image area and the person's area which is the feature area, respectively, the blurring discrimination processing is executed onto the blurring discrimination subject.

Likewise Step S2803, the blurring discrimination processing on the whole image area is the same as the processing described as processing of Step S104 in the first embodiment, and therefore description thereof will be omitted.

As follows, inclusive of the reason why discrimination using another reference value in a feature area is implemented, blurring discrimination processing in an extracted feature area will be described.

Figure 19:
FIG. 19 is a drawing of exemplifying an image (sample 3) where a person as a feature area according to the present invention is included.

FIG. 19 features an image sample 4, which is a photographed image including a person as an object approximately in the center, and which has been photographed well and has incurred no blurring.

FIG. 32 shows data detected by implementing detection processing for blurring discrimination on a feature area detected in the image sample 4, and the same items as in FIG. 29 are described there.

As apparent from FIG. 32, the image sample 4 can be confirmed to be basically in a state of less substantial bias, while the percentage of vertical and horizontal candidate blocks is 27% for vertical and is 59% for horizontal so that the horizontal direction percentage gets slightly large. In addition, it is apparent that the percentage of the oblique candidate (13%, 2%) is extremely low compared with vertical and horizontal.

Figure 20:
FIG. 20 is a drawing of showing distribution of blurring candidate blocks detected by applying blurring discrimination processing according to the present invention to the image in FIG. 19.

The image sample 4 having undergone color coding in accordance with detected classification blocks on the basis of the detected data is shown in FIG. 20. From FIG. 20, no particular direction block is observed to be abundant in percentage, and no occurrence of blurring can be confirmed.

Figure 21:
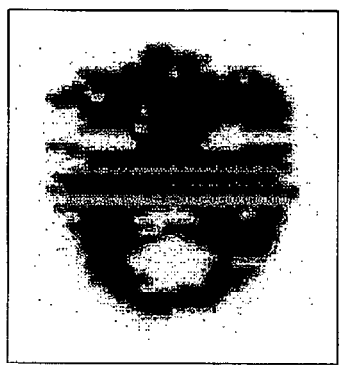
FIG. 21 is a drawing of showing a result subject to feature extraction onto the image in FIG. 19 according to the present invention to implement area extraction.

In addition, a detection result of a person's area of feature area extraction processing is shown in FIG. 21.

Compared with the preceding FIG. 20, presence of 8×8 pixel blocks of blurring discrimination in the person's face area in FIG. 20 can be confirmed to be not abundant. The reason thereof is that discrimination is difficult with blurring discrimination reference which takes into consideration the whole image area, since spatial frequency components are comparatively not large in the flesh portion in a person's face in contrast with the other portions. In addition, when application is intended to the whole image by using reference value matched with a person's face area, appropriate discrimination in the area other than the person's face area will, become difficult.

In addition, since a person's face area etc. is considered to be an area where an observer of the image focuses his attention most, even tiny blurring that will be allowable in the area other than the person could be considered not to be allowable.

As a result thereof, for an image having undergone a process of extracting a person's areas, discrimination reference to be used on the whole image area and discrimination reference to be used on a person's area are made separately so that blurring discrimination processing is executed on them respectively. Since discrimination processing method on person's areas and the blurring discrimination processing for the whole image are different only in the reference value and the processing area, descriptions on the processing procedure therefore will be omitted.

As comprehensive discrimination of blurring discrimination, discrimination is implemented, for example, by using logical addition of results of blurring discrimination in the whole image area and the area subjected to feature extraction.

In the present embodiment, the method using a plurality of references when person extraction is implemented has been described, but blurring discrimination may be implemented only based on human areas.

In Step S1307, in image quality discrimination reference shown in the preceding FIG. 40, extraction is implemented in Step S1303 as well as in Step S1304, the discriminated result is reflected. Specifically, in case of success in extraction of a person, the discrimination of image quality evaluation of "middle" is processed as "low" image quality level, while in case of failure in extraction of a person, processing is implemented with the discrimination of image quality evaluation of "middle" regarded as "high" image quality level.

Contents overlap with the above described embodiment except for reflection of person extraction onto an important area with, and therefore description thereon will be omitted.

In Step S1308 to Step S1311, processing that is the same as that in Steps S106 to S109 of the first embodiment is implemented to derive a printing output.

According to the present embodiment, by implementing processing in consideration of feature area that is seemed to attract attention of an observer, such an effect is attained that a more preferable result on visual characteristics is derived.

The object of the present invention can also be achieved by providing a storage medium storing program codes for performing the aforesaid processes to an image processing apparatus, reading the program codes, by a CPU or MPU of the image processing apparatus, from the storage medium, then executing the program.

In this case, the program codes read from the storage medium realize the functions according to the embodiments, and the storage medium storing the program codes constitutes the invention.

Further, the storage medium, such as a floppy disk, a hard disk, an optical disk, a magneto-optical disk, CD-ROM, CD-R, a magnetic tape, a non-volatile type memory card, and ROM, and computer network, such as LAN (local area network) and WAN (wide area network), can be used for providing the program codes.

Furthermore, besides aforesaid functions according to the above embodiments are realized by executing the program codes which are read by a CPU of the image processing apparatus, the present invention includes a case where an OS (operating system) or the like working on the computer performs a part or entire processes in accordance with designations of the program codes and realizes functions according to the above embodiments.

Furthermore, the present invention also includes a case where, after the program codes read from the storage medium are written in a function expansion card which is inserted into the image sensing system or apparatus or in a memory provided in a function expansion unit which is connected to the image processing apparatus, CPU or the like contained in the function expansion card or unit performs a part or entire process in accordance with designations of the program codes and realizes functions of the above embodiments.

The present invention is not limited to the above embodiments and various changes and modifications can be made within the spirit and scope of the present invention. Therefore to apprise the public of the scope of the present invention, the following claims are made.

This application claims priority from Japanese Patent Application Nos. 2004-353245 filed Dec. 6, 2004, and 2005-347568 filed Dec. 1, 2005, which are hereby incorporated by reference herein.

What is claimed is:

1. An image processing method of laying out a plurality of image data based on template data, which image data and template data are stored in a storing device, to output images, the method being executable by a computer, the method comprising:

an inputting step of inputting setting items, including a similar image detection, a blurring image detection, an image quality discrimination, and a number of images used for laying out the plurality of image data;

an obtaining step of obtaining the plurality of image data from the storing device;

a similar image detecting step of, based on the similar image detection setting item, determining whether an image from the plurality of image data is divided into blocks on a plurality of pixels basis, said blocks being compressed using DCT and having values of AC components, and detecting a degree of similarity of the image based on information relating to a file name and photographing information and the values of AC components in the image;

a blurring image detecting step, based on the blurring image detection setting item, of:

setting a quantization table for the image from the image data using the values of AC components of the image;

comparing a total value of the quantization table with a first predetermined threshold to set each blocks as a blurring candidate block or a non-blurring candidate block;

calculating a block ratio of the blurring candidate block and the non-blurring candidate block;

comparing the calculated block ratio with a second threshold to discriminate whether or not the image is in a state of non-blurring;

detecting a blurring direction for each block according to the values of AC components of the respective block with respect to vertical, horizontal, left-oblique, and right oblique directions;

determining a blurring state based on the detected blurring direction for each block;

a layout controlling step of controlling reading out results of the respective setting items and determining whether the image is inserted into a small area of the template data or not based on a level of the setting items of the image, wherein the computer executes the inputting step, the obtaining step, the similar image detecting step, the blurring image detecting step, and the layout controlling step.

2. An image processing apparatus for laying out a plurality of image data based on template data, which image and template data are stored in a storing device, to output images, the image processing apparatus comprising:

an inputting means for inputting setting items, including a similar image detection, a blurring image detection, an image quality discrimination, and a number of images used for laying out the plurality of image data;

an obtaining means for obtaining the plurality of image data from the storage device;

similar image detecting means for, based on the similar image detection setting item, determining whether an image from the plurality of image data is divided into blocks on a plurality of pixels basis, said blocks being compressed using DCT and having values of AC components, and detecting a degree of similarity of the image based on information relating to a file name and photographing information and the values of AC components in the image; and blurring image detecting means, based on the blurring image detection setting item, for:

setting a quantization table for the image from the image data using the values of AC components of the image;

comparing a total value of the quantization table with a first predetermined threshold to set each blocks as a blurring candidate block or a non-blurring candidate block;

calculating a block ratio of the blurring candidate block and the non-blurring candidate block;

comparing the calculated block ratio with a second threshold to discriminate whether or not the image is in a state of non-blurring;

detecting a blurring direction for each block according to the values of AC components of the respective block with respect to vertical, horizontal, left-oblique, and right oblique directions; and determining a blurring state based on the detected blurring direction for each block; and layout controlling means for controlling reading out results of the respective setting items and determining whether the image is inserted into a small area of the template data or not based on a level of the setting items of the image.

3. The method according to claim 1, further comprising an output step of outputting the images represented by said plurality of image data that are laid out in said layout controlling step.

4. The apparatus according to claim 2, further comprising an output device that outputs the images represented by said plurality of image data that are laid out in said layout controlling means.

* * * * *